US011487478B2

(12) United States Patent
Kanno

(10) Patent No.: US 11,487,478 B2
(45) Date of Patent: Nov. 1, 2022

(54) MEMORY SYSTEM AND METHOD OF CONTROLLING NONVOLATILE MEMORY

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 44 days.

(21) Appl. No.: 17/202,704

(22) Filed: Mar. 16, 2021

(65) Prior Publication Data

US 2022/0057966 A1 Feb. 24, 2022

(30) Foreign Application Priority Data

Aug. 21, 2020 (JP) .............................. JP2020-140065

(51) Int. Cl.
*G06F 3/06* (2006.01)
(52) U.S. Cl.
CPC .......... *G06F 3/0659* (2013.01); *G06F 3/0604* (2013.01); *G06F 3/0652* (2013.01); *G06F 3/0653* (2013.01); *G06F 3/0679* (2013.01)
(58) Field of Classification Search
CPC .... G06F 3/0659; G06F 3/0604; G06F 3/0652; G06F 3/0653; G06F 3/0679; G06F 3/0611; G06F 3/061; G06F 3/0688; G06F 3/0673; G06F 3/0613; G06F 3/0656; G06F 13/1642; G06F 13/26; G06F 13/18; G06F 13/1626; G06F 13/1688; G06F 2212/1024
See application file for complete search history.

(56) References Cited

U.S. PATENT DOCUMENTS

| 9,575,677 | B2 | 2/2017 | Ellis et al. |
| 10,592,126 | B2 | 3/2020 | Lee et al. |
| 11,074,015 | B2* | 7/2021 | Kanno .................. G06F 3/0659 |
| 2017/0262228 | A1* | 9/2017 | Kanno .................. G06F 3/0679 |
| 2019/0155546 | A1 | 5/2019 | Cai et al. |
| 2020/0285416 | A1* | 9/2020 | Wu .......................... G06F 3/061 |
| 2020/0356407 | A1* | 11/2020 | Ji ......................... G06F 12/0292 |

* cited by examiner

*Primary Examiner* — Reginald G Bragdon
*Assistant Examiner* — Curtis James Kortman
(74) *Attorney, Agent, or Firm* — Oblon, McClelland, Maier & Neustadt, L.L.P.

(57) ABSTRACT

According to one embodiment, when a command executed in a nonvolatile memory is an erase/program command and when a cumulative weight value satisfies a condition that a first input is selected as an input of high priority, a memory system suspends execution of the erase/program command by transmitting a suspend command to the nonvolatile memory. The memory system repeats executing an operation of starting the execution of one read command of the first input and an operation of updating the cumulative weight by using the weight associated with the read command until read command no longer exists in the first input or until the condition that the cumulative weight is larger than the first value is not satisfied, and resumes the execution of the suspended erase/program command.

17 Claims, 16 Drawing Sheets

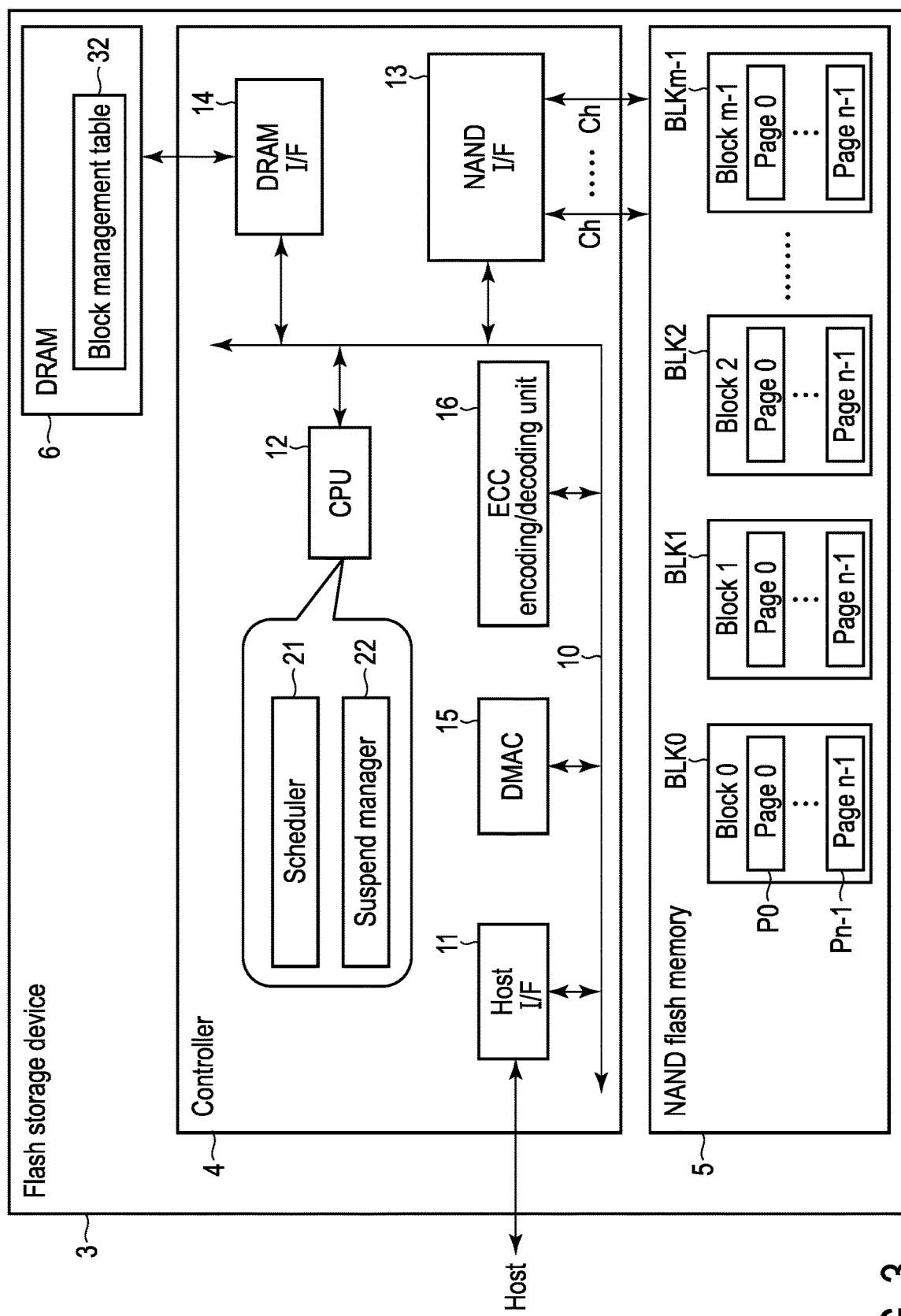
F I G. 3

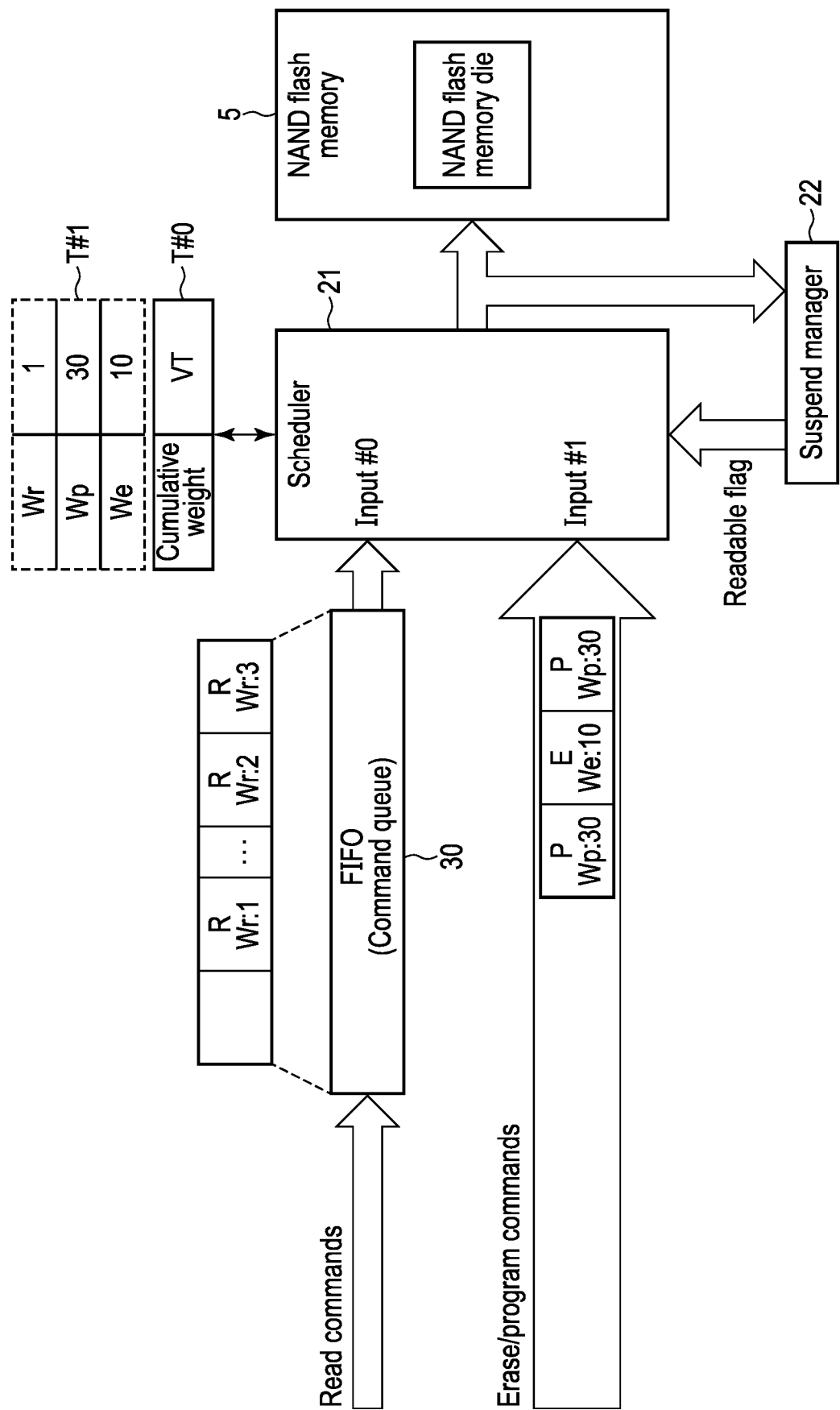
F I G. 5

| VT | t | t+1 | t+2 | t+3 | |
|---|---|---|---|---|---|
| | 0 | -1 | -2 | -3 | ... |
| R | Initialize | Execute read command<br>Wr:1 | Execute read command<br>Wr:1 | Execute read command<br>Wr:1 | ... |

| R | R | R |
|---|---|---|
| Wr:1 | Wr:1 | Wr:1 |

—Input #0

Wr: Weight corresponding to read command (A)

| VT | t | t+1 | t+2 | t+3 | |
|---|---|---|---|---|---|
| | 0 | +30 | +40 | +40 | ... |
| E/P | Initialize | Execute program command<br>Wp:30 | Execute erase command<br>We:10 | Execute program command<br>Wp:30 | ... |

| P | E | P |
|---|---|---|
| Wp:30 | We:10 | Wp:30 |

—Input #1

Wp: Weight corresponding to program command
We: Weight corresponding to erase command (B)

FIG. 6

When program command is executed after execution of read command

| VT  | t | t+1 | t+2 | t+3 | t+4 | ... |
|-----|---|-----|-----|-----|-----|-----|
|     | 0 | −1  | −2  | +28 | +27 | ... |
| R   | Initialize | Execute read command<br>Wr:1 | Execute read command<br>Wr:1 | — | Execute read command<br>Wr:1 | ... |
| E/P | Initialize | — | — | Execute program command<br>Wp:30 | — | ... |

F I G. 8

MEMORY SYSTEM AND METHOD OF CONTROLLING NONVOLATILE MEMORY

CROSS-REFERENCE TO RELATED APPLICATIONS

This application is based upon and claims the benefit of priority from Japanese Patent Application No. 2020-140065, filed Aug. 21, 2020, the entire contents of which are incorporated herein by reference.

FIELD

Embodiments described herein relate generally to a technology of controlling a nonvolatile memory.

BACKGROUND

In recent years, memory systems comprising nonvolatile memories are widely prevailing. As such memory systems, a solid state drive (SSD) implemented with a NAND flash memory has been known.

The SSD are used as storage devices of various host computing systems, such as a server of a data center.

In the storage device such as SSD, implementation of a new technology for flexibly controlling access to the nonvolatile memory is required.

BRIEF DESCRIPTION OF THE DRAWINGS

FIG. 3 is a block diagram illustrating a configuration example of the memory system according to the embodiment.

FIG. 5 is a diagram illustrating a scheduling operation performed by a scheduler in the memory system of the embodiment.

FIG. 6 is a diagram illustrating a virtual time (VT) update operation executed when the execution of the read command of a first input (input #0) of the scheduler is started, and a VT update operation executed when the execution of the erase/program command of a second input (input #1) of the scheduler is started.

FIG. 8 is a diagram illustrating an operation of executing the program command of input #1 after executing the read command of input #0.

DETAILED DESCRIPTION

Various embodiments will be described hereinafter with reference to the accompanying drawings.

In general, according to one embodiment, a memory system comprises a nonvolatile memory and a controller electrically connected to the nonvolatile memory. The controller selects an input of high priority whose command is to be executed, based on a cumulative weight, from a first input for receiving read commands to be transmitted to the nonvolatile memory and a second input for receiving erase commands to be transmitted to the nonvolatile memory and program commands to be transmitted to the nonvolatile memory. The controller starts execution of a command corresponding to the selected input of high priority, and updates the cumulative weight by using a weight associated with the command whose execution is started.

When execution of a command of one of the first input and the second input is started, the cumulative weight is updated to a value obtained by subtracting the weight associated with the command of the one of the inputs from the cumulative weight.

When execution of a command of the other of the first input and the second input is started, the cumulative weight is updated to a value obtained by adding the weight associated with the command of the other input to the cumulative weight.

While a first condition that a value of the cumulative weight is larger than a first value is satisfied, the one of the inputs is selected as the input of high priority. While a second condition that the value of the cumulative weight is smaller than the first value is satisfied, the other of the inputs is selected as the input of high priority.

When a command which is being executed in the nonvolatile memory is an erase/program command and when the value of the cumulative weight satisfies a condition that the first input is selected as the input of high priority, of the first condition and the second condition, the controller suspends execution of the erase/program command by transmitting a suspend command to the nonvolatile memory.

The controller repeats executing an operation of starting execution of one read command of the first input and an operation of updating the cumulative weight by using the weight associated with the one read command until read command no longer exists in the first input or until the cumulative weight does not satisfy the condition that the first input is selected as the input of high priority, and resumes execution of the suspended erase/program command.

Figure 1:
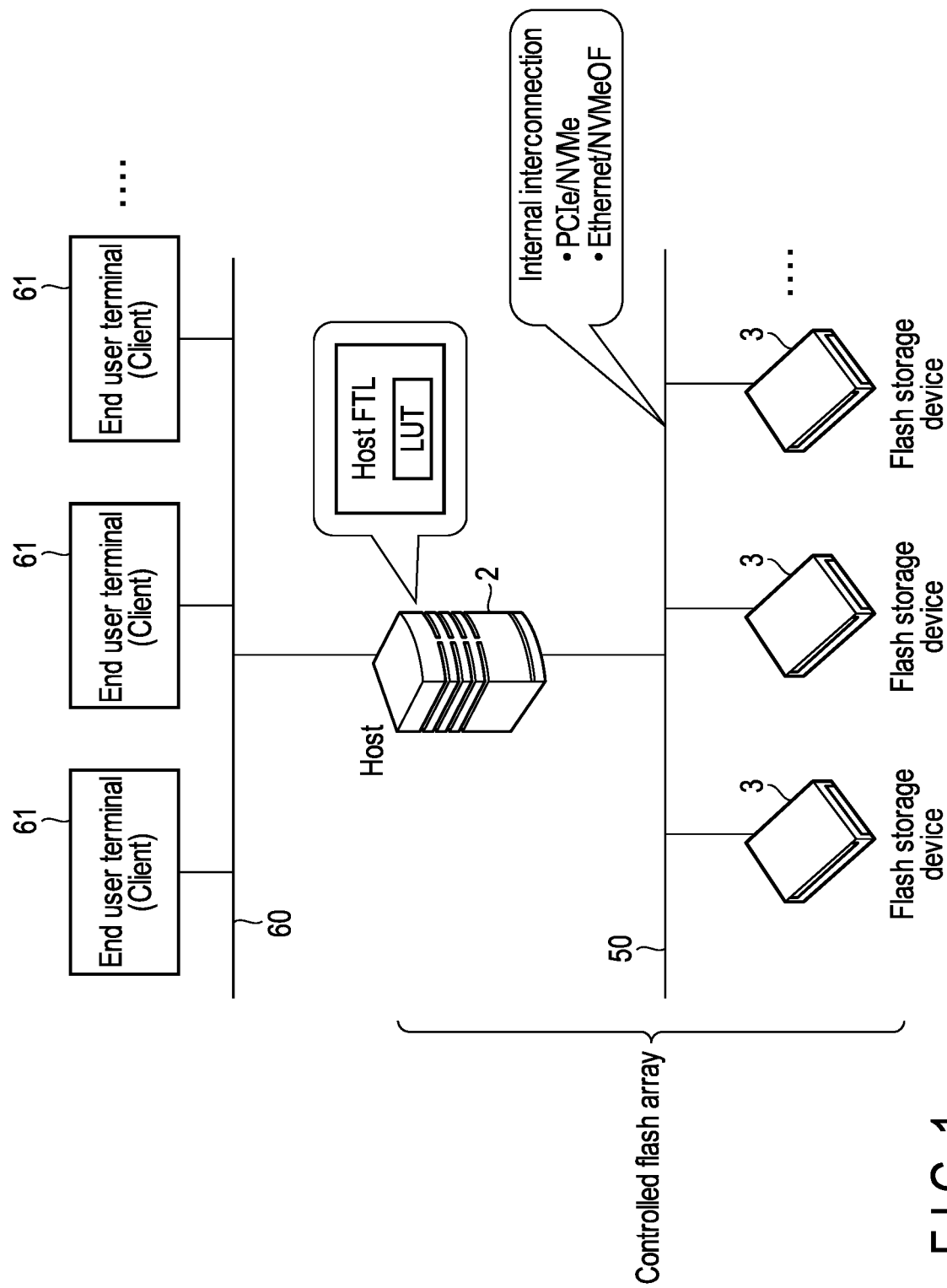
FIG. 1 is a block diagram illustrating a relationship between a host and a memory system according to an embodiment.

First, a relationship between a host and a memory system according to an embodiment will be described with reference to FIG. 1.

The memory system is a semiconductor storage device configured to write data to a nonvolatile memory and to read data from the nonvolatile memory. The memory system is realized as a flash storage device 3 including a NAND flash memory.

The host (host device) 2 is configured to control a plurality of flash storage devices 3. The host 2 is realized by an information processing apparatus configured to use a flash array including the plurality of flash storage devices 3 as a storage. This information processing apparatus may be a personal computer or a server computer.

The flash storage device 3 may be utilized as one of a plurality of storage devices provided in a storage array. The storage array may be connected to the information processing apparatus such as a server computer via a cable or a network. The storage array includes a controller which controls a plurality of storage devices in the storage array. When the flash storage device 3 is applied as one of the storage devices in the storage array, the controller of the storage array may function as the host of the flash storage devices 3.

An example that the information processing apparatus such as the server computer functions as the host 2 will be described below.

The host (server) 2 and the plurality of flash storage devices 3 are interconnected via an interface 50 (internal interconnection). PCI Express (PCIe) (registered trademark), NVM Express (NVMe) (registered trademark), Ethernet (registered trademark) or NVMe over Fabrics (NVMeOF) may be used as standards for the interface 50 for the interconnection. However, the interface 50 is not limited to these examples.

A typical example of the server computer which functions as the host 2 is a server computer (hereinafter referred to as a server) in a data center.

In a case where the host 2 is implemented by the server in the data center, the host (server) 2 may be connected to a plurality of end user terminals (clients) 61 via a network 60. The host 2 can provide various services to the end user terminals 61.

Examples of services which can be provided by the host (server) 2 are (1) Platform as a Service (PaaS) which provides a system running platform to each client (each end user terminal 61), (2) Infrastructure as a Service (IaaS) which provides an infrastructure such as a virtual server to each client (each end user terminal 61), and the like.

A plurality of virtual machines may be executed on a physical server which functions as the host (server) 2. Each of the virtual machines running on the host (server) 2 can function as a virtual server configured to provide various services to the clients (end user terminals 61) corresponding to this virtual machine. An operating system and a user application that are used by the end user terminals 61 corresponding to this virtual machine are executed in each of the virtual machines.

A flash translation layer (host FTL) is also executed in the host (server) 2. The host FTL includes a lookup table (LUT), i.e., an address translation table which manages mapping between each of data identifiers (tags) to identify access target data and each of physical addresses of the nonvolatile memory in the flash storage device 3. The host FTL can recognize data placement on the nonvolatile memory in the flash storage device 3 by using the LUT.

The flash storage device 3 includes a nonvolatile memory such as a NAND flash memory. The nonvolatile memory includes a plurality of blocks. Each of the plurality of blocks includes a plurality of pages. Each of the blocks is a unit of a data erase operation of erasing data. The data erase operation is referred to as an erase operation or a block erase. Each of the plurality of pages included in each block is a unit of a data write operation of writing data to the nonvolatile memory and a data read operation of reading data from the nonvolatile memory.

The flash storage device 3 can execute low-level abstraction. The low-level abstraction is a function for abstraction of the nonvolatile memory. The low-level abstraction includes a function of assisting the data placement on the nonvolatile memory, and the like. Examples of the function of assisting the data placement include a function of allocating a write destination block to which user data is to be written from the host 2, a function of determining a write destination location (write destination block and location in the write destination block) of the user data, a function of notifying an upper layer (host 2) of the physical address (block address and in-block offset) indicative of the write destination location to which the user data is written, and the like.

The block address is a block identifier for identifying a specific one block of the plurality of blocks included in the nonvolatile memory. When the nonvolatile memory includes a plurality of nonvolatile memory dies, the block address is represented by a combination of the die identifier and the block address. Alternatively, when each nonvolatile memory die includes a plurality of planes, the block address is represented by a combination of a plane identifier and the block address.

In addition, examples of the function of assisting the data placement may include a function of allocating copy destination block to which user data already written to the nonvolatile memory is to be copied, a function of determining a copy destination location (copy destination block and location in the copy destination block) of the user data, a function of notifying the upper layer (host 2) of the physical address (block address and in-block offset) indicative of the copy destination location to which the user data is copied, and the like.

The flash storage device 3 executes various commands which are received from the host 2. These commands include a write command to write data to the nonvolatile memory in the flash storage device 3, a read command to read data from the nonvolatile memory, a copy command to copy data already written to the nonvolatile memory to the other storage location in the nonvolatile memory, and the like.

Figure 2:
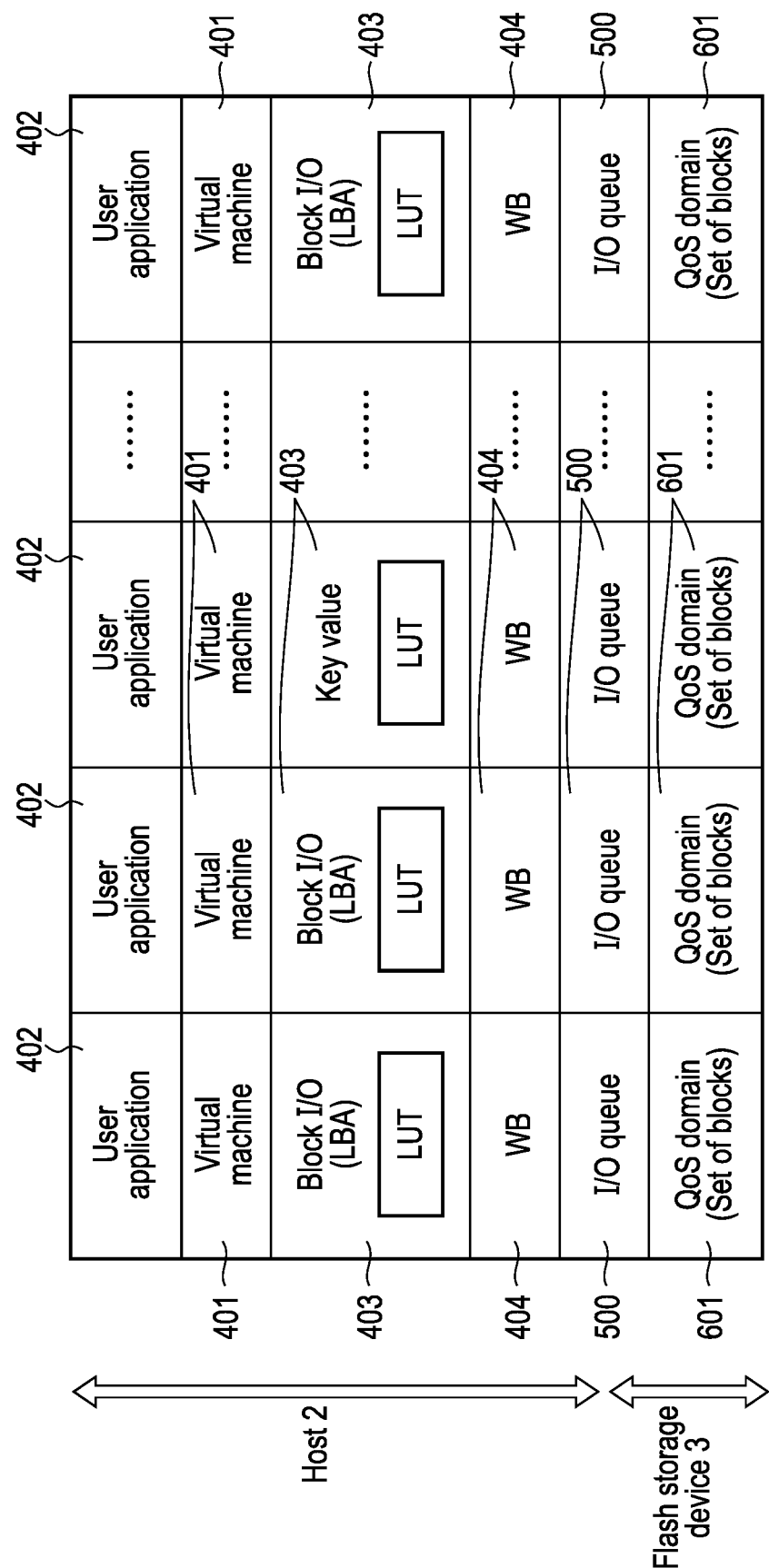
FIG. 2 is a diagram illustrating role sharing between the host and the memory system according to the embodiment.

FIG. 2 illustrates role sharing between the flash storage device 3 and the host 2.

In the host (server) 2, a plurality of virtual machines 401 corresponding to a plurality of end users, respectively, are executed. In each of the virtual machines 401, the operating system and a user application 402, which are used by the corresponding end user, are executed.

In addition, a plurality of I/O services 403 corresponding to a plurality of user applications 402 are executed in the host (server) 2. The I/O services 403 may include logical block address (LBA)-based block I/O service, key-value store service, and the like. Each of the I/O services 403 includes a lookup table (LUT) which manages mapping between each of the tags and each of the physical addresses of the flash storage device 3.

The tag is indicative of a data identifier for identifying access target data. For example, the logical address such as LBA is used as the tag. Alternatively, the user address (for example, a key of a key-value store, a hash value of this key, or the like) may be used as the tag.

The physical address of the flash storage device 3 is an address for identifying a physical storage location in the nonvolatile memory included in the flash storage device 3.

In the LBA-based block I/O service, LUT which manages mapping between each of the logical addresses (LBAs) and each of the physical addresses of the flash storage device 3 may be used.

In contrast, in the key-value store service, LUT which manages mapping among each of keys (hash values of the keys), each of the physical addresses of the flash storage devices 3 storing the data corresponding to these keys, and each of data lengths of the data corresponding to the keys, may be used.

Each of the end users can select an addressing method (LBA, the key of the key-value store, the hash value of the key, or the like) to be used.

A plurality of write buffers (WB) 404 corresponding to the plurality of virtual machines 401 are managed in the host (server) 2. Write data from a certain user application 402 is temporarily stored in the write buffer (WB) 404 for the virtual machine 401 corresponding to the user application 402.

Transmission of the command from the host (server) 2 to the flash storage device 3 and return of a response of command completion or the like from the flash storage device 3 to the host (server) 2 are executed via an I/O queue 500 which exists in each of the host (server) 2 and the flash storage devices 3.

The flash storage device 3 manages, as QoS domain 601, each of a plurality of regions obtained by logically dividing the nonvolatile memory in the flash storage device 3. Each of the QoS domains 601 is a subset of the plurality of blocks included in the nonvolatile memory. Each of the plurality of blocks included in the nonvolatile memory belongs to only one QoS domain 601, but the same block does not simultaneously belong to different QoS domains 601.

The QoS domains 601 are identified by identifiers referred to as QoS domain IDs, respectively. The QoS domain IDs are used as a plurality of identifiers for access to the plurality of regions (the plurality of QoS domains).

In the embodiment, each write command (write request) issued by the host 2 designates, for example, the QoS domain ID, a tag of the write data (for example, LBA of the write data), a length of the write data, and a buffer address indicative of a location in a memory included in the host 2 in which the write data is stored. The memory of the host 2 is simply referred to as a host memory in the following descriptions.

When receiving the write command from the host 2, the flash storage device 3 selects one free block of a free block group included in the QoS domain corresponding to the QoS domain ID designated by the write command, executes an erase operation (data erase operation) for the selected free block, and allocates the free block for which the erase operation is executed as a new write destination block for this QoS domain.

The write destination block is indicative of a block to which data is to be written. When the write destination block for this QoS domain is already allocated, execution of the process of allocating the new write destination block for this QoS domain is unnecessary.

The flash storage device 3 retrieves write data associated with the write command received from the host 2, from the host memory, and writes the retrieved write data to a write destination block newly allocated for this QoS domain (or the write destination block already allocated for this QoS domain).

In this case, the flash storage device 3 writes the write data received from the host 2 to the write destination block together with a tag of the write data (for example, LBA of the write data).

When the write data associated with the received write command is written to the write destination block, the flash storage device 3 transmits to the host 2 the tag of this data, the length of the data, and a physical address (block address and in-block offset) indicative of the physical storage location where the data is written, as an address recording request. The address recording request is used as a physical address notification message to notify the host 2 of the physical address indicative of the physical storage location where the data is written.

In accordance with reception of the address recording request from the flash storage device 3, the host 2 updates a logical-to-physical address translation table (LUT) of the host 2 such that this physical address is associated with the tag such as LBA of this data.

The host 2 can manage the data stored in each of the physical storage locations of the nonvolatile memory of the flash storage device 3 as valid data or invalid data by using the LUT. The valid data is indicative of the latest data associated with a tag such as LBA. In other words, the data linked to the logical-to-physical address translation table (LUT) of the host 2 as the latest data is the valid data. In addition, invalid data is indicative of the data which is not associated with the tag such as LBA. The data which is not linked to LUT of the host 2 is the invalid data. For example, when updated data corresponding to a certain LBA is written to the flash storage device 3, previous data corresponding to the LBA becomes invalid data.

Each read command (read request) issued from the host 2 designates, for example, the physical address (block address and in-block offset) indicative of the physical storage location where the read target data is stored, the length of the read target data, and the buffer address indicative of the location in the host memory to which the read target data is to be transferred.

When receiving the read command from the host 2, the flash storage device 3 reads the read target data from the physical storage location in the nonvolatile memory indicated by the physical address designated by the received read command, and transfers the read target data to the location in the host memory indicated by the buffer address designated by the received read command.

Each copy command (copy request) issued by the host 2 is indicative of, for example, a physical address indicative of a copy source block (i.e., a block address of a copy source block), a physical address indicative of a copy destination block (i.e., a block address of a copy destination block), and a valid bit map corresponding to the copy source block.

The valid bit map includes a plurality of bits corresponding to a plurality of physical storage locations in the copy source block, respectively. Each of the plurality of bits is indicative of whether or not valid data is present at the physical storage location corresponding to this bit or not. In other words, the valid bit map is indicative of whether the data stored in the copy source block is valid data or invalid data.

In response to reception of the copy command from the host 2, the flash storage device 3 determines each valid data among data stored in the copy source block and copies each valid data stored in the copy source block to the copy destination block, based on the valid bit map. In this case, the flash storage device 3 copies each valid data stored in the copy source block to the copy destination block together with the tag corresponding to each valid data (for example, LBA of the valid data).

Then, the flash storage device 3 transmits to the host 2, for example, an address changing request which designates the tag (for example, LBA) of the copied valid data, a length of the valid data, a copy source physical address of the valid data, and a copy destination physical address of the valid data.

FIG. 3 illustrates a configuration example of the flash storage device 3.

The flash storage device 3 includes a controller 4 and a nonvolatile memory (for example, a NAND flash memory 5). The flash storage device 3 may include a random access memory, for example, a DRAM 6.

The NAND flash memory 5 includes a memory cell array including a plurality of memory cells arranged in a matrix. The NAND flash memory 5 may be a NAND flash memory having a two-dimensional structure or a NAND flash memory having a three-dimensional structure.

The memory cell array of the NAND flash memory 5 includes a plurality of blocks BLK0 to BLKm-1. Each of the blocks BLK0 to BLKm-1 includes plural pages (pages P0 to Pn-1 in this case). Each of the blocks BLK0 to BLKm-1 functions as a unit for a data erase operation. Blocks are often referred to as "erase blocks", "physical blocks", or "physical erase blocks". Each of the pages P0 to Pn-1 is a unit for a data write operation of writing data and a data read operation of reading data.

The controller 4 is electrically connected to the NAND flash memory 5 which is a nonvolatile memory via a NAND interface 13 such as Toggle NAND flash interface or open NAND flash interface (ONFI). The controller 4 operates as a memory controller configured to control the NAND flash memory 5. The controller 4 may be implemented by a circuit such as a System-on-a-chip (SoC).

Figure 4:
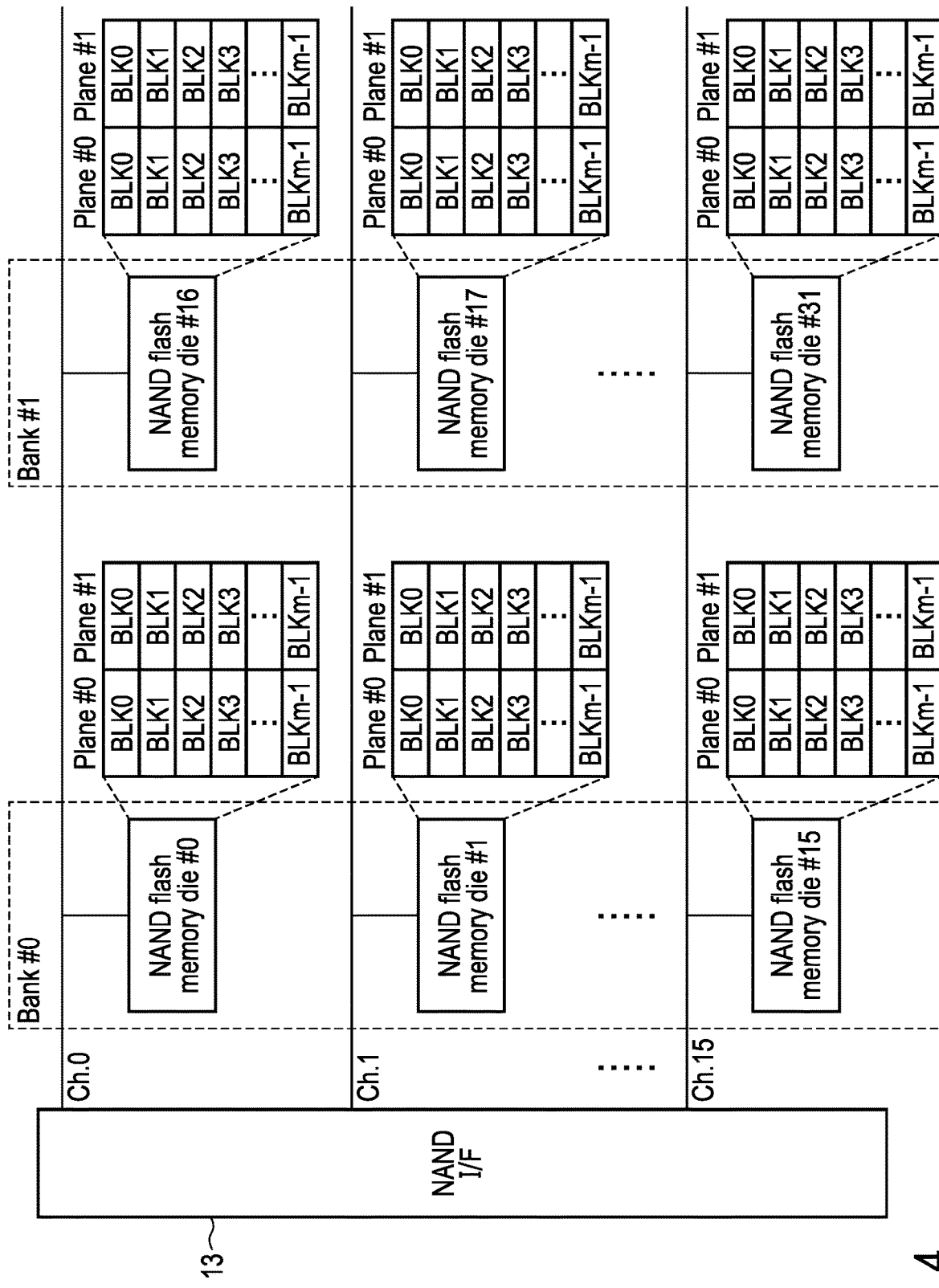
FIG. 4 is a block diagram illustrating a relationship between a plurality of channels and a plurality of NAND flash memory dies, which are used in the memory system according to the embodiment.

As illustrated in FIG. 4, the NAND flash memory 5 may include a plurality of NAND flash memory dies #0 to #31 (NAND flash memory chips). Each of the NAND flash memory dies #0 to #31 can operate independently. For this reason, Each of the NAND flash memory dies #0 to #31 functions as a unit for a parallel operation. FIG. 4 illustrates an example that sixteen channels Ch. 0 to Ch. 15 are connected to the NAND interface 13 and two NAND flash memory dies are connected to each of sixteen channels Ch. 0 to Ch. 15.

In this case, sixteen NAND flash memory dies #0 to #15 connected to the channels Ch. 0 to Ch. 15 may be constructed as bank #0 and the remaining sixteen NAND flash memory dies #16 to #31 connected to the channels Ch. 0 to Ch. 15 may be constructed as bank #1.

The bank functions as a unit for causing a plurality of memory dies to execute the parallel operation by bank interleaving. In the configuration example illustrated in FIG. 4, up to thirty-two NAND flash memory dies can be operated in parallel by sixteen channels and bank interleaving using two banks.

The data erase operation and the block allocate operation are executed in a unit of one block. In this case, one block may be one physical block or one block group including a set of a plurality of physical blocks capable of operating in parallel. The block group is also referred to as a super block.

One block group, i.e., one super block including a set of a plurality of physical blocks is not limited to this, but may include a total of thirty-two physical blocks each selected from the NAND flash memory dies #0 to #31. Each of the NAND flash memory dies #0 to #31 may have a multiplane configuration. For example, when each of the NAND flash memory dies #0 to #31 has the multiplane configuration including two planes (plane #0 and plane #1), the total number of planes included in the NAND flash memory 5 is sixty-four. One super block may include sixty-four physical blocks that are selected from sixty-four planes included in the NAND flash memory 5, respectively.

In the operation of writing the data to one super block, data write operations for the NAND flash memory dies #0 to #31 are executed in parallel. Thus, for example, the operations of writing the write data of thirty-two pages (or the write data of sixty-four pages in the multi-plane configuration including plane #0 and plane #1) to the NAND flash memory dies #1 to #32 in the NAND flash memory 5 can be executed in parallel.

Next, the configuration of the controller 4 of FIG. 3 will be described.

The controller 4 includes a host interface 11, a CPU 12, a NAND interface 13, a DRAM interface 14, a direct memory access controller (DMAC) 15, an ECC encoding/decoding unit 16, and the like. The host interface 11, the CPU 12, the NAND interface 13, the DRAM interface 14, the DMAC 15, and the ECC encoding/decoding unit 16 are interconnected via the bus 10.

The host interface 11 is a host interface circuit configured to execute communications with the host 2. The host interface 11 may be, for example, a PCIe controller (NVMe controller). Alternatively, in the configuration that the flash storage device 3 is connected to the host 2 via Ethernet (registered trademark), the host interface 11 may be an NVMe over Fabrics (NVMeOF) controller.

The host interface 11 receives various commands from the host 2. These commands include the above-described write commands, read commands, copy commands, and the like.

The CPU 12 is a processor configured to control the host interface 11, the NAND interface 13, the DRAM interface 14, the DMAC 15, and the ECC encoding/decoding unit 16. The CPU 12 loads a control program (firmware) from the NAND flash memory 5 or a ROM (not shown) to the DRAM 6 in response to power-on of the flash storage device 3, executes the firmware, and thereby executes various processes.

The CPU 12 can execute a command process for processing various commands from the host 2, and the like. In the command process, the CPU 12 controls a write control operation of writing data to the NAND flash memory 5 and a read control operation of reading data from the NAND flash memory 5, based on each write command and each read command received from the host 2.

Furthermore, to execute the above copy command, the CPU 12 executes a read control operation of reading valid data from one or more copy source blocks as copy target data, and a write control operation of writing the copy target data to the copy destination block.

In addition, the CPU 12 also controls execution of a data erase operation for each of the blocks in the NAND flash memory 5 as needed.

The operations of the CPU 12 are controlled by the above-described firmware. A part or all parts of the command process may be executed by dedicated hardware in the controller 4.

Furthermore, the CPU 12 can function as a scheduler 21 and a suspend manager 22. A part or all parts of the scheduler 21 and the suspend manager 22 may also be implemented by dedicated hardware in the controller 4.

The scheduler 21 executes a scheduling operation of accepting a plurality of commands for access to the NAND flash memory 5 and determining commands to be transmitted to the NAND flash memory 5, of the commands.

The access to the NAND flash memory 5 includes a write operation (program operation) of writing data to the NAND flash memory 5, a read operation of reading data from the NAND flash memory 5, and a data erase operation of erasing data already written to the NAND flash memory 5 in block units.

Therefore, the commands to be transmitted to the NAND flash memory 5 for access to the NAND flash memory 5 are roughly classified into erase commands, program commands, and read commands.

In the controller 4, each write command received from the host 2 is transmitted to the scheduler 21 as a program command to be transmitted to the NAND flash memory 5. Each read command received from the host 2 is transmitted to the scheduler 21 as a read command to be transmitted to the NAND flash memory 5.

In addition, in the controller 4, a read command and a program command for executing the data read operation and the data write operation which correspond to each copy command received from the host 2 are generated. The read command and the program command generated by the controller 4 are also transmitted to the scheduler 21 as a read command and a program command to be transmitted to the NAND flash memory 5.

In addition, in the operation of allocating the write destination block, the controller 4 generates an erase command to execute the erase operation for the free block. The erase command generated by the controller 4 is transmitted to the scheduler 21 as an erase command to be transmitted to the NAND flash memory 5.

The erase command is used to execute the erase operation of erasing data in block units. The program command is used to write the write data received from the host 2 or the copy target data designated by the copy command from the host 2, to the NAND flash memory 5. The read command is used to read the read target data required by the host 2 or the copy target data designated by the copy command from the host 2, from the NAND flash memory 5.

Thus, the NAND flash memory 5 is configured to execute the read command, the erase command, and the program command.

In the NAND flash memory 5, the time required to execute the read command (read operation) is shorter than the time required to execute the erase command (erase operation) or the program command (program operation).

The time required to execute the read command (read operation) is, for example, several tens of μs to 100 μs. The time required to execute the erase command (erase operation) or the program command (program operation) is, for example, 1 ms to several ms.

Thus, the time required to execute one erase/program command (one erase command or one program command) is ten to several tens of times as long as the time required to execute one read command.

In addition, the host 2 often requests the flash storage device 3 to distribute the total access time of the NAND flash memory 5 to the read operation and the program operation at a predetermined ratio.

It is assumed here that, for example, the host 2 requests 50% of the total access time of the NAND flash memory 5 to be allocated to the read operation and requests the remaining time to be allocated to the program operation, i.e., requests the access time to be distributed to the read operation and the program operation at a ratio of 1:1. In a case where the time required to execute one read command is 100 μs and the time required to execute one program command is 3 ms, the time required to execute one program command is thirty times longer than the time required to execute one read command. Therefore, in this case, the scheduler 21 executes the scheduling operation such that read commands are executed thirty times more frequently than program commands. Thus, the time distribution of the read operation and the program operation can be set at a ratio of 1:1.

In addition, the host 2 often requests the distribution of the time to the read operation, the erase operation, and the program operation to be executed at a ratio of 1:1:1. In a case where the time required to execute one read command is 100 μs, and the time required to execute one erase command is 1 ms, and the time required to execute one program command is 3 ms, the time required to execute one erase command is ten times longer than the time required to execute one read command, and the time required to execute one program command is thirty times longer than the time required to execute one read command. Therefore, the scheduler 21 executes the scheduling operation such that the read commands are executed ten times more frequently than erase commands and that the read commands are executed thirty times more frequently than program commands. Thus, distribution of the time to the read operation, the erase operation, and the program operation can be executed at a ratio of 1:1:1.

Furthermore, the host 2 often requests the flash storage device 3 to suppress the variation amount of latency (read latency) of the read command below a certain value.

Therefore, in the embodiment, considering that the time required to execute one erase/program command (i.e., one erase command or one program command) is ten to several tens of times as long as the time required to execute one read command, the scheduler 21 executes the scheduling operation of selecting the input of high priority whose command is to be executed, from a first input for accepting read commands to be transmitted to the NAND flash memory 5 and a second input for accepting erase commands to be transmitted to the NAND flash memory 5 and program commands to be transmitted to the NAND flash memory 5.

Executing the command is indicative of transmitting a command sequence for executing the operation corresponding to this command to the NAND flash memory 5 and thereby causing the NAND flash memory 5 to execute the operation corresponding to this command.

The scheduler 21 manages cumulative weight to control this scheduling operation. The cumulative weight is a parameter used to set the priority order of the first input (first command group) and the second input (second command group). The cumulative weight is updated by using a weight associated with each command whose execution is started.

First, a case of using, for example, a policy (policy #1) of selecting the first input (first command group) as the input (command group) of high priority when the cumulative weight is larger than the first value (for example, an initial value) and selecting the second input (second command group) as the input (command group) of high priority when the cumulative weight is smaller than the initial value, will be described.

In this case, when execution of one read command of the first input is started, the cumulative weight is updated to a value obtained by subtracting the weight associated with one read command from the cumulative weight.

In addition, when execution of one erase/program command of the second input is started, the cumulative weight is updated to a value obtained by adding the weight associated with one erase/program command to the cumulative weight.

The first input is selected as the input of high priority while a first condition that the cumulative weight value is larger than the first value is satisfied. That is, each read command input to the first input is executed with a higher priority than each erase command and each program command input to the second input while the cumulative weight value is larger than the first value. In contrast, the second input is selected as the input of high priority while a second condition that the cumulative weight value is smaller than the first value is satisfied. That is, each erase command and each program command input to the second input are executed with a higher priority than each read command input to the first input while the cumulative weight value is smaller than the first value.

Therefore, for example, when the weight associated with each read command is set to a small value, the cumulative weight is reduced only slightly even if the first input is once selected as the input of high priority. Even if execution of one read command of the first input is started, the cumulative weight is reduced only slightly. Thus, the cumulative weight can easily be maintained as a value larger than the first value and, consequently, the first input can easily be selected again as the input of high priority.

In addition, when the weight associated with each erase/program command is set to a large value, the cumulative weight is greatly increased, once the second input is selected as the input of high priority. Therefore, when the weight associated with each erase/program command is set to a large value, the cumulative weight is greatly increased, once the second input is selected as the input of high priority. Thus, the second input can hardly be selected as the input of high priority for a while.

Therefore, for example, in a case where the weight associated with each read command is set to 1 and the weight associated with each erase/program command is set to 30, the read commands input to the first input can be executed at a frequency thirty times as large as the erase/program command.

When the cumulative weight is equal to the first value, either the read command of the first input or the erase/program command of the second input may be executed. In addition, even if the cumulative weight is smaller than the first value, the read command of the first input is executed when the erase/program command is not input to the second input. Similarly, even if the cumulative weight is larger than the first value, the erase/program command of the second input is executed when the read command is not input to the first input.

In addition, after the cumulative weight value reaches a certain upper limit value, the cumulative weight value is not increased but maintained at the upper limit value even if execution of a new erase/program command is started. Similarly, after the cumulative weight value reaches a certain lower limit value, the cumulative weight value is not reduced but maintained at the lower limit value even if execution of a new read command is started.

The example of using the policy #1 has been described above. However, a policy #2 may be used instead of the policy #1.

In the policy #2, the first input (i.e., first command group) is selected as the input of high priority (i.e., command group of high priority) when the cumulative weight is smaller than the initial value (for example, 0), and the second input (i.e., second command group) is selected as the input of high priority (i.e., command group of high priority) when the cumulative weight is larger than the initial value.

In the case of using the policy #2, when execution of one read command of the first input is started, the cumulative weight is updated to a value obtained by adding the weight associated with one read command to this cumulative weight. In addition, when execution of one erase/program command of the second input is started, the cumulative weight is updated to a value obtained by subtracting the weight associated with one erase/program command from the cumulative weight.

In addition, in the case of using the policy #2, the first input is selected as the input of high priority while the second condition that the cumulative weight value is smaller than the first value (i.e., the initial value) is satisfied. That is, while the cumulative weight value is smaller than the first value, each read command input to the first input is executed with a higher priority than each erase command and each program command input to the second input.

In contrast, the second input is selected as the input of high priority while the first condition that the cumulative weight value is larger than the first value is satisfied. That is, each erase/program command input to the second input is executed with a higher priority than each read command input to the first input while the cumulative weight value is larger than the first value.

Thus, when the execution of a command of one of the first input and the second input is started, the cumulative weight is updated to a value obtained by subtracting the weight associated with the command of the one of the inputs from the cumulative weight. In addition, when execution of a command of the other of the first input and the second input is started, the cumulative weight is updated to a value obtained by adding the weight associated with the command of the other input to the cumulative weight.

Then, one of the inputs is selected as the input of high priority while the first condition that the cumulative weight value is larger than the first value is satisfied, and the other input is selected as the input of high priority while the second condition that the cumulative weight value is smaller than the first value is satisfied.

A condition for selecting the first input as the input of high priority may be the first condition or the second condition. One of the first condition and the second condition is used as the condition for selecting the first input as the input of high priority, and the other condition is used as the condition for selecting the second input as the input of high priority.

In this case, the scheduler 21 selects the first input as the input of high priority while the cumulative weight value satisfies one of the first condition and the second condition. Then, the scheduler 21 starts execution of the read command input to the first input and thereby executes reading the data from the NAND flash memory 5. Furthermore, the scheduler 21 adds the weight associated with this read command to the cumulative weight or subtracts the weight associated with this read command from the cumulative weight by performing an arithmetic operation of one of the addition or the subtraction, and thereby updates the cumulative weight.

Updating the cumulative weight is executed when execution of the command present in the selected input is started, for example, when the input of high priority for which the command is to be executed is determined.

The scheduler 21 selects the second input as the input of high priority while the cumulative weight value satisfies the other of the first condition and the second condition. Then, the scheduler 21 starts execution of the erase/program command input to the second input and thereby executes erasing the data stored in the NAND flash memory 5 (block erase) or writing the data to the NAND flash memory 5. Furthermore, the scheduler 21 subtracts the weight associated with the erase/program command from the cumulative weight or adds the weight associated with the erase/program command to the cumulative weight by performing an arithmetic operation of the other of the addition or the subtraction, and thereby updates the cumulative weight.

It is assumed here that, for example, the second input is selected as the input of high priority. When the command arriving at the second input is a program command, the scheduler 21 transmits a command sequence for executing a program operation corresponding to this program command to the NAND flash memory 5 and thereby causes the NAND flash memory 5 to start the program operation. This command sequence includes, for example, a first program command, address, write data, and a second program command. When the command arriving at the second input is an erase command, the scheduler 21 transmits a command sequence for executing the erase operation corresponding to this erase command to the NAND flash memory 5 and thereby causes the NAND flash memory 5 to start the erase operation for the block designated by this command sequence. This command sequence includes, for example, a first erase command, an address, and a second erase command.

Next, it is assumed that the first input is selected as the input of high priority. The scheduler 21 transmits a command sequence for executing a read operation corresponding to the read command arriving at the first input, to the NAND flash memory 5, and thereby causes the NAND flash memory 5 to start the read operation. This command sequence includes, for example, a first read command, an address, and a second read command.

In the following descriptions, the scheduling operation will be explained by exemplifying a case where the policy #1 is used.

In the scheduling operation, the scheduler 21 executes the following suspend operation to suppress the variation amount of read latency below a certain value.

The suspend operation is an operation of suspending the execution of the erase/program command, which is being executed by the NAND flash memory 5, and instead starting the execution of the read command which is input to the first input.

That is, when the command executed in the NAND flash memory 5 is the erase/program command (erase command or program command) of the second input and when the condition that the current cumulative weight value is larger than the first value (also referred to as the suspend condition) is satisfied (in a case where the policy #2 is used, when the condition that the current cumulative weight value is smaller than the first value is satisfied), the scheduler 21 suspends execution of the erase command or the program command by transmitting a suspend command to the NAND flash memory 5.

The suspend command is a command to cause the NAND flash memory die to temporarily suspend the operation (in this example, the erase operation of the program operation) which is being executed and to set the NAND flash memory die to be capable of accepting and executing the other command.

The NAND flash memory 5, i.e., each of the NAND flash memory dies included in the NAND flash memory 5 has a function of suspending the execution of the erase/program command and executing one or more read commands while the execution of the erase/program command is suspended.

After suspending the execution of the erase/program command, the scheduler 21 repeats executing the operation of starting the execution of one read command of the first input and the operation of updating the cumulative weight by using the weight associated with this read command until read command no longer exists in the first input or until the condition that the cumulative weight is larger than the first value is not satisfied (in the case where the policy #2 is used, until the condition that the current cumulative weight value is smaller than the first value is not satisfied), and then resumes the execution of the erase/program command which is being suspended.

Thus, even when the read command arrives at the scheduler 21 from the host 2 while the erase/program command is executed, the execution of the read command can be quickly started without awaiting the read command until the execution of the erase/program command is completed, for example, until 3 ms have elapsed.

It is assumed here that, for example, a plurality of read commands, for example, three read commands are input to the scheduler 21 from the host 2 after starting the execution of the erase/program command is started. The cumulative weight value is already increased by the weight associated with the erase/program command at the time when the execution of the erase/program command is started.

For example, when the increased cumulative weight is 3, the scheduler 21 suspends the execution of the erase command or the program command by transmitting the suspend command to the NAND flash memory 5 since the cumulative weight value is larger than the first value (for example, 0).

The scheduler 21 executes the operation of starting the execution of the initial read command by transmitting the command sequence corresponding to the initial read command, of three read commands, to the NAND flash memory 5, and an operation of updating the cumulative weight by subtracting the weight associated with the initial read command from the cumulative weight. The cumulative weight is reduced from 3 to 2. However, the cumulative weight is still larger than the first value (for example, 0).

Therefore, when the execution of the initial read command is completed, the scheduler 21 executes the operation of starting the execution of the second read command by transmitting the command sequence corresponding to the second read command, of three read commands, to the NAND flash memory 5, and an operation of updating the cumulative weight by subtracting the weight associated with the second read command from the cumulative weight. The cumulative weight is reduced from 2 to 1. However, the cumulative weight is still larger than the first value (for example, 0).

Therefore, when the execution of the second read command is completed, the scheduler 21 executes the operation of starting the execution of the third read command by transmitting the command sequence corresponding to the third read command, of three read commands, to the NAND flash memory 5, and an operation of updating the cumulative weight by subtracting the weight associated with the third read command from the cumulative weight. The cumulative weight is reduced from 1 to 0.

Therefore, when the execution of the third read command is completed, the scheduler 21 resumes the execution of the suspended erase/program command by transmitting to the NAND flash memory 5 the command (also referred to as a resume command) to instruct resuming the execution of the command which is being suspended.

Thus, the scheduler 21 repeats executing the operation of starting the execution of one read command of the first input and the operation of updating the cumulative weight by using the weight associated with this one read command, until read command no longer exists in the first input or until the condition that the cumulative weight is larger than the first value is not satisfied, and then resumes the execution of the erase/program command which is being suspended.

Therefore, the variation amount of the read latency can be reduced while the ratio of the number of the executed read commands to the number of the executed erase/program commands is controlled to be close to the ratio corresponding to the time distribution, which is required by the host 2.

In other words, in the embodiments, based on the cumulative weight, the scheduler 21 selects the command group of high priority which is to be executed, from the first command group (i.e., a set of commands input to the first input) including the read commands to be transmitted to the NAND flash memory 5, and the second command group (i.e., a set of commands to be input to the second input) including erase commands to be transmitted to the NAND flash memory 5 and program commands to be transmitted to the NAND flash memory 5. The scheduler 21 starts the execution of one command corresponding to the selected command group of high priority and updates the cumulative weight by using the weight associated with this one command.

When the command which is being executed in the NAND flash memory 5 is the erase/program command in the second command group and when the cumulative weight value satisfies the condition that the first command group is selected as the command group of high priority, the scheduler 21 suspends the execution of the erase/program command by transmitting the suspend command to the NAND flash memory 5. Then, the scheduler 21 repeats executing the operation of starting the execution of the read command in the first command group and the operation of updating the cumulative weight by using the weight associated with this read command, until read command no longer exists in the first command group or until the cumulative weight does not satisfy the condition for selecting the first command group as the command group of high priority, and then resumes the execution of the erase/program command which is being suspended.

The number of times of suspension allowed during the execution of one erase/program command or the total suspension time allowed during the execution of the one erase/program command is not necessarily unlimited. The number of times of suspension allowed during the execution of the one erase/program command or the total suspension time allowed during the execution of the one erase/program command is set by specifications of the NAND flash memory 5.

For example, it is assumed here that the number of times of suspension allowed during the execution of the same erase/program command is limited to five times. Even when a plurality of read commands are sequentially executed during one-time suspension of a certain erase/program command, the number of times of suspension of this erase/program command is one time. When the execution of this erase/program command is resumed and then suspended again, the number of times of suspension of the erase/program command is two times.

Therefore, after the number of times of suspension of the same erase/program command reaches the upper limit of the number of times (in this example, five times), the scheduler 21 continues the execution of this erase/program command without suspending the execution of the erase/program command, irrespective of the cumulative weight value. Thus, several read commands can be executed with a higher priority than the erase/program command, during the execution of the erase/program command, within a range of the restrictions on the number of time of suspension allowed in the NAND flash memory 5.

In the embodiments, when a plurality of read commands arrive and the cumulative weight is larger than or equal to the sum of weights of the respective read commands, the scheduler 21 can execute the plurality of read commands during one-time suspension. For this reason, the variation of the read latency can be efficiently reduced under the condition of the limited number of times of suspension.

Next, it is assumed that the total suspension time allowed during the execution of the same erase/program command is limited to 1 ms. In this case, after the total suspension time of the same erase/program command reaches 1 ms, the scheduler 21 continues the execution of this erase/program command without suspending the execution of the erase/program command, irrespective of the cumulative weight value.

For example, when the time required for the execution of one read command is 100 μs and ten read commands are executed during the first suspension of a certain erase/program command, the total of the first suspension time is 1 ms (=100 μs×10). For this reason, after resuming the execution of this erase/program command, the scheduler 21 continues the execution of the erase/program command without suspending the execution of the erase/program command, irrespective of the cumulative weight value.

In addition, for example, when the time required for the execution of one read command is 100 μs, the execution of a certain erase/program command is suspended at ten times, and one read command is executed at each suspension time, the total suspension time of this erase/program command is also 1 ms (=100 μs×10). For this reason, after the execution of this erase/program command is resumed after the tenth suspension of the erase/program command, the scheduler 21 continues the execution of the erase/program command without suspending the execution of the erase/program command, irrespective of the cumulative weight value.

Thus, in the embodiments, when the upper limit value is determined for the number of times of suspension allowed during the execution of one erase/program command or the total suspension time allowed during the execution of one erase/program command, in the NAND flash memory 5, the scheduler 21 continues the execution of the erase/program command without suspending the execution of the erase/program command, even if the current cumulative weight is larger than the first value, after the number of times of suspension or the total suspension time for the erase/program command which is being executed has reached the upper limit value. Thus, several read commands can be executed with a higher priority than the erase/program command, during the execution of the erase/program command, within a range of the restrictions on the number of time of suspension or the restrictions on the total suspension time as allowed in the NAND flash memory 5.

In addition, in the NAND flash memory 5, the upper limit value of the allowed number of times of suspension is set for the erase command alone, and the upper limit value of the allowed total suspension time is set for the program command alone, in some cases. In this case, when the command which is being executed is the erase command, the scheduler 21 continues the execution of this erase command without suspending the execution of the erase command, irrespective of the current cumulative weight, after the number of times of suspension of the erase command has reached the upper limit value of the allowed number of times of suspension. When the command which is being executed is the program command, the scheduler 21 continues the execution of this program command without suspending the execution of the program command, irrespective of the current cumulative weight, after the total suspension time of the program command has reached the upper limit value of the allowed total suspension time.

Furthermore, an interval time to be secured between the resumption of the execution of one erase/program command and a next suspension is often further determined in the NAND flash memory 5. Therefore, in this case, the scheduler 21 continues the execution of the erase/program command without suspending the execution of the erase/program command, irrespective of the cumulative weight value, while the elapsed time from the resumption of the execution of one erase/program command is not so long as the interval time.

Thus, the scheduler 21 can assure the reliability of operations of the NAND flash memory 5 by executing the suspend operation under restriction on the number of times of suspension of each erase/program command, restriction on the total suspension time of each erase/program command, and restriction on the interval time from the resumption of the execution of each erase/program command until a next suspension of each erase/program command.

In addition, the scheduler 21 has a function of optimizing the number of read commands that can be stored in a command queue provided in the controller 4 to store one or more read commands, based on the current cumulative weight.

More specifically, when the cumulative weight satisfies the condition that the first input is selected as the input of high priority, i.e., when the cumulative weight is larger than the first value (for example, 0), the scheduler 21 sets the upper limit of the number of read commands that can be stored in the command queue to the number proportional to the cumulative weight value.

For example, it is assumed here that the execution of the erase/program command is started and the cumulative weight value is thereby updated from 0 to 30. In this case, when the weight associated with each read command is 1, the upper limit of the number (i.e., maximum number) of read commands that can be stored in the command queue is set to 30. Thus, the upper limit of the number of read commands that can be stored in the command queue can be set to the number required to restore the ratio of the number of the executed read commands to the number of the executed erase/program commands to the ratio 30:1 corresponding to the time distribution, which is required by the host 2. As a result, control of making the ratio between the number of the executed read commands and the number of the executed erase/program commands close to the ratio corresponding to the time distribution, which is required by the host 2, can be efficiently executed without increasing the size of the command queue more than required.

When execution of one of the read commands stored in the command queue is started, the cumulative weight is updated from 30 to 29. The upper limit of the number of read commands that can be stored in the command queue is also updated from 30 to 29. Thus, the upper limit of the number of read commands that can be stored in the command queue is varied in accordance with the variation of the cumulative weight.

The case where the cumulative weight value is 30 and the weight associated with each read command is 1 has been described. However, when the cumulative weight value is 30 and the weight associated with each read command is 2, the upper limit of the number (i.e., maximum number) of read commands that can be stored in the command queue is set to 15.

Thus, when read commands whose number corresponds to the current cumulative weight value arrive at the scheduler 21 during the execution of the erase/program command, all the read commands can be stored in the command queue.

Alternatively, when the weights associated with a plurality of read commands stored in the command queue, respectively, are values different from each other, the upper limit of the number of read commands that can be stored in the command queue can be set such that the sum of the weights of the plurality of read commands is smaller than or equal to VT value.

When the execution of the erase/program command is completed, the scheduler 21 can sequentially execute the plurality of read commands already stored in the command queue. Therefore, the ratio of the number of the executed read commands to the number of the executed erase/program commands can be quickly restored to the ratio corresponding to the time distribution required by the host 2.

For example, it is assumed here that when the upper limit of the number of times of suspension is five, five read commands are executed by suspending a certain erase/program command at five times. In this case, the cumulative weight value is updated from 30 to 25. Since the cumulative weight value is larger than 0, the suspend condition is satisfied. However, since the number of times of suspension reaches the upper limit, the execution of the erase/program command can be no longer suspended.

In the embodiments, however, since the read commands whose number corresponds to the cumulative weight value=25 can be stored in the command queue, a maximum of twenty-five read commands can be sequentially executed immediately after the execution of this erase/program command is completed.

In contrast, when the cumulative weight does not satisfy the condition that the first input is selected as the input of high priority, i.e., when the cumulative weight is equal to the first value (for example, 0) or smaller than 0, the scheduler 21 sets the upper limit of the number of read commands that can be stored in the command queue to 1. Thus, the maximum number of read commands that can be stored in the command queue can be maintained at 1 while the cumulative weight does not satisfy the condition that the first input is selected as the input of high priority. Therefore, for example, when erase/program command no longer exists in the second input, the read command in the command queue can be executed quickly.

As for the method of limiting the maximum number of read commands that can be stored in the command queue, a method of preparing a command queue of a variable length and varying the length (depth) of the command queue based on the current cumulative weight value can be employed.

Alternatively, a method of preparing a command queue of a fixed length and, after the number of commands stored in the command queue reaches the maximum number determined based on the current cumulative weight value, prohibiting a subsequent read command to be stored in the command queue may be employed.

In addition, the controller 4 may transmit a plurality of read commands stored in the command queue to the scheduler 21 in the order of storing the read commands in the command queue or may transmit the read commands to the scheduler 21 in the order of smaller weights associated with the respective read commands.

The number of times of suspension or the total suspension time for the erase/program command which is being executed is managed by the suspend manager 22.

The NAND interface 13 is a memory control circuit configured to control the NAND flash memory 5 under control of the CPU 12.

The DRAM interface 14 is a DRAM control circuit configured to control the DRAM 6 under the control of the CPU 12. A memory region of the DRAM 6 is used to store the block management table 32. The block management table 32 includes a plurality of management tables corresponding to a plurality of blocks in the NAND flash memory 5, respectively. Each of the management tables is used to store management information (metadata) for managing a block corresponding to the management table. The metadata may include a rewrite count (number of program/erase cycles) of the corresponding block, an open/close state of the corresponding block, and the like. The open/close state is indicative of an open state or closed state of this block. The open state is indicative of a state in which this block is being used as a write destination block. The closed state is indicative of a state in which the block is filled with the data and managed as an active block. However, the metadata is not limited to the example.

The DMAC 15 executes data transfer between the write buffer of the host 2 and the DRAM 6 (internal buffer) under control of the CPU 12. When the write data needs to be transferred from the write buffer of the host 2 to the internal buffer, the CPU 12 designates a transfer source address indicative of a location on the write buffer where the write data is stored, data size of the write data, and a transfer destination address indicative of a location on the internal buffer where the write data is to be transferred, for the DMAC 15.

When the data is to be written to the NAND flash memory 5, the ECC encoding/decoding unit 16 adds an error-correcting code (ECC) to the write data to be written to the NAND flash memory 5 by encoding (ECC-encoding) the write data. When the data is read from the NAND flash memory 5, the ECC encoding/decoding unit 16 executes error correction of this data by using the ECC added to the read data (ECC decoding).

FIG. 5 is a block diagram illustrating the scheduling operation executed by the scheduler 21. The scheduling operation in a case of using the above policy #1 will be mainly described below. However, the scheduling operation in a case of using the above policy #2 can also be executed, similarly to the scheduling operation in the case of using the policy #1 described below.

The scheduler 21 executes the scheduling operation for each NAND flash memory die included in the NAND flash memory 5. The scheduling operation for a certain NAND flash memory die will be exemplified below. However, the scheduling operation for the other NAND flash memory dies will be executed in the same procedure.

The commands (read command, erase command, and program command) to access the NAND flash memory die are input to the scheduler 21.

The scheduler 21 executes the scheduling operation of controlling the ratio between the first command group (i.e., a set of read commands) and the second command group (i.e., a set of erase commands and a set of program commands), which are to be executed in the NAND flash memory die, as a certain ratio. The scheduling operation is implemented by adding control of suspending the erase/program command which is being executed in the NAND flash memory die, to weighted fair queuing (WFQ).

The scheduler 21 includes the first input (input #1) for accepting the first command group to be transmitted to the NAND flash memory die and the second input (input #2) for accepting the second command group to be transmitted to the corresponding NAND flash memory die.

The scheduling operation is executed by using the cumulative weight corresponding to this NAND flash memory die and the weight associated with each command for the NAND flash memory die. In FIG. 5, a parameter which is referred as a virtual time (VT) is indicative of the above-described cumulative weight.

The scheduler 21 manages VT by using cumulative weight management table T #0. Each read command includes a parameter indicative of weight Wr associated with the read command. Similarly, each erase command includes a parameter indicative of weight We associated with the erase command, and each program command includes a parameter indicative of weight Wp associated with the program command.

It is assumed here that, for example, the host 2 requests the flash storage device 3 to set the time distribution of the read operation, the erase operation, and the program operation to a ratio of 1:1:1. When the time required to execute one read command is, for example, 100 μs, when the time required to execute one erase command is, for example, 1 ms, and when the time required to execute one program command is, for example, 3 ms, the controller 4, for example, sets the weight Wr associated with the read command to 1, sets the weight We associated with the erase command to 10, and sets the weight Wp associated with the write command to 30.

In addition, the host 2 often requests the flash storage device 3 to execute the read commands from end user A at a frequency double as larger as the read commands from end user B, and requests the flash storage device 3 to execute the read commands from end user A at a frequency three times as large as the read commands from end user C.

In this case, the controller 4 may set the weight Wr associated with each read command from end user A to 1, set the weight Wr associated with each read command from end user B to 2, and set the weight Wr associated with each read command from end user C to 3.

Note that, all the read commands may have the same weight Wr, all the program commands may have the same weight Wp, and all the erase commands may have the same weight We. In this case, the scheduler 21 manages the weight Wr (for example, 1) associated with each read command, the weight Wp (for example, 30) associated with each program command, and the weight We (for example, 10) associated with each erase command, by using the weight management table T #1.

A command queue 30 for storing one or more read commands is arranged in the front stage of input #1 of the scheduler 21. The command queue 30 is implemented as, for example, a first-in first-out buffer (FIFO buffer). The upper limit of the number of read commands that can be stored in the command queue 30 is limited to the value proportional to the current VT value.

The suspend manager 22 monitors the number of times of suspension or the total suspension time for the erase/program command which is being executed, based on the command sequence output from the scheduler 21 to the NAND flash memory die. When the command which is being executed in the NAND flash memory die is the erase command or the program command and when the number of times of suspension or the total suspension time for the erase command or the program command which is being executed is smaller than the upper limit value, the suspend manager 22 sets a flag (readable flag) indicative of being capable of suspending to the on state.

When VT is larger than the first value (for example, 0) and the readable flag is the on state, the scheduler 21 suspends the execution of the erase/program command and, instead, starts the execution of the read command which is present in input #1.

In contrast, when the readable flag is the off state, the scheduler 21 does not suspend the execution of the erase/program command but continues the execution of the erase/program command even if VT is larger than the first value (for example, 0).

FIG. 6 is a diagram illustrating a VT update operation executed when the execution of the read command of input #0 of the scheduler is started, and a VT update operation executed when the execution of the erase or program command of input #1 of the scheduler is started.

First, a case where three read commands are sequentially input to input #0 and the erase command or the program command is not input at all to input #1 will be described with reference to (A) of FIG. 6. In each read command input to input #0, the weight Wr (=1) is set. The flash storage device 3 sequentially executes these read commands.

First, at time t, the VT value is set to an initial value (for example, 0). This initial value is used as the first value. Since it is assumed here that the erase command or the program command is not input at all to input #1, the first read command of input #0 is selected as a next execution target command. When the execution of the first read command is started, at time t+1, the weight Wr corresponding to the first read command is subtracted from VT such that VT=0−1=−1.

When the execution of the first read command is completed, the execution of the second read command is started at time t+2. When the execution of the second read command is started, at time t+1, the weight Wr corresponding to the second read command is subtracted from VT such that VT=−1−1=−2.

When the execution of the second read command is completed, the execution of the third read command is started at time t+3. When the execution of the third read command is started, the weight Wr corresponding to the third read command is subtracted from VT such that VT=−2−1=−3.

Thus, every time the execution of each read command is started, the VT value is updated by using the weight corresponding to each read command.

Next, a case where the read command is not input at all to input #0 and the program command, the erase command, and the program command are input in this order to input #1 will be described with reference to (B) of FIG. 6.

First, at time t, the VT value is set to an initial value (for example, 0). Since it is assumed here that the read command is not input at all to input #0, the first command (in this example, program command) of input #1 is selected as a next execution target command. When the execution of the program command is started, at time t+1, the weight Wp (=30) corresponding to the program command is added to VT such that VT=0+30=+30.

When the execution of this program command is completed, the execution of a next command (in this example, an erase command) is started at time t+2. When the execution of the erase command is started, the weight We (=10) corresponding to the erase command is added to VT such that VT=30+10=+40.

When the execution of this program command is completed, the execution of a next command (in this example, a program command) is further started at time t+3. When the upper limit value of VT is set to +40, the VT value is maintained at the upper limit value (=+40) even if the execution of this program command is already started.

Thus, every time the execution of the program command or the erase command is started, the VT value is updated with the weight corresponding to the program command or the erase command.

Figure 7:
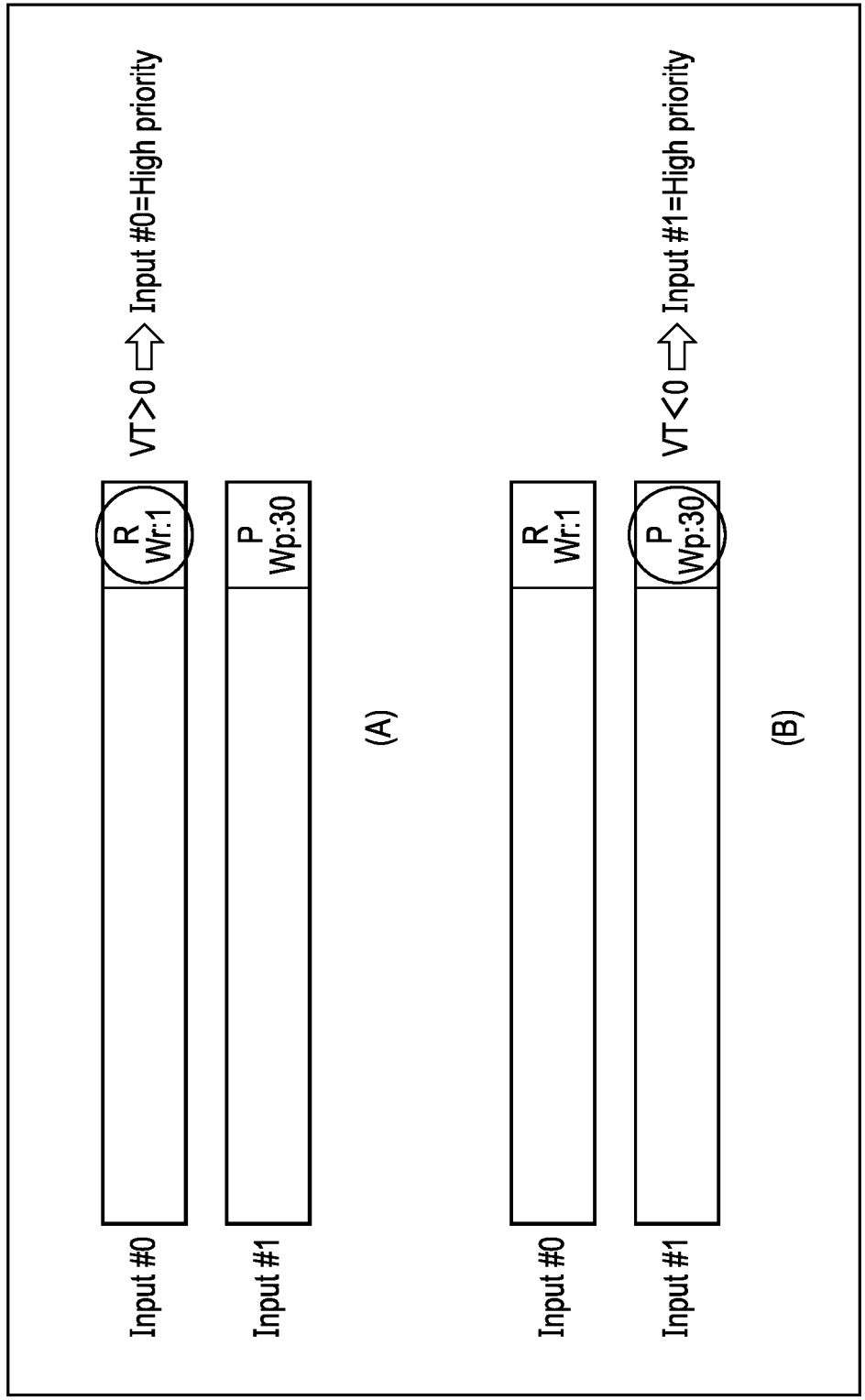
FIG. 7 is a diagram illustrating an operation of selecting an input of high priority whose command is to be executed, from input #0 and input #1, based on the VT value.

FIG. 7 is a diagram illustrating an operation of selecting the input of high priority from input #0 and input #1, based on the VT value. In each of (A) and (B) of FIG. 7, it is assumed that the command is input to each of two inputs, i.e., input #0 and input #1.

(A) of FIG. 7 illustrates an example in which the VT value is larger than 0. When VT is larger than 0, the scheduler 21 selects input #0 as the input of high priority and starts the execution of the command (read command) input to input #0.

(B) of FIG. 7 illustrates an example in which the VT value is smaller than 0. When VT is smaller than 0, the scheduler 21 selects input #1 as the input of high priority and starts the execution of the command (in this example, the program command) input to input #1.

FIG. 8 is a diagram illustrating an operation of starting the execution of the program command input to input #1 after the execution of several read commands input to input #0 is completed.

First, at time t, the VT value is set to an initial value (for example, 0). It is assumed here that two read commands are sequentially input to input #0 and the erase command or the program command is not input at all to input #1.

At time t+1, the execution of the first read command of input #0 is started, and the weight Wr (=1) corresponding to the first read command is subtracted from VT such that VT=0−1=−1. Next, at time t+2, the execution of the second read command is started, and the weight Wr (=1) corresponding to the second read command is subtracted from VT such that VT=−1−1=−2. When the program command is input to input #1, the scheduler 21 selects input #1 as the input of high priority since VT<0.

Therefore, at time t+3, the execution of the program command is started, and the weight Wp (=30) corresponding to the program command is added to VT such that VT=−2+30=+28. It is assumed here that a subsequent read command is input to input #0. In this case, when the execution of the program command is completed, the scheduler 21 selects input #0 as the input of high priority since VT>0.

Then, at time t+4, the execution of the subsequent read command is started, and the weight Wr (=1) corresponding to the subsequent read command is subtracted from VT such that VT=+28−1=+27.

Thus, each command is executed while the cumulative weight VT value is updated in accordance with the weight of each command.

Figure 9:
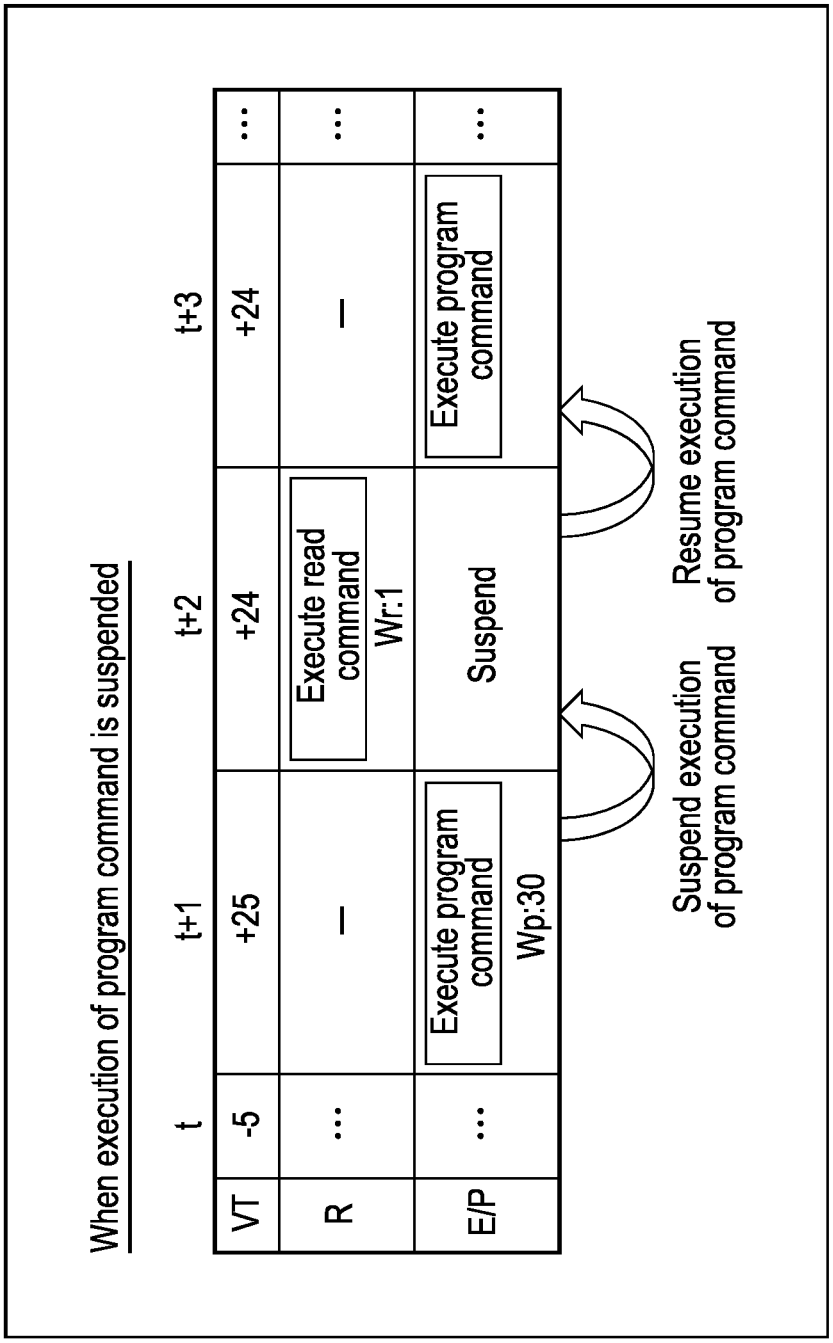
FIG. 9 is a diagram illustrating an operation of suspending the execution of the program command of input #1 and executing the read command of input #0 while the execution of the program command is suspended.

FIG. 9 is a diagram illustrating an operation of suspending the execution of the program command of input #1 and executing the read command of input #0 while the execution of the program command is suspended.

When VT=−5, at certain time t, the scheduler 21 selects input #1 as the input of high priority since VT<0. At time t+1, the execution of the program command is started, and the weight Wp (=30) corresponding to the program command is added to VT such that VT=−5+30=+25.

Since the program command is being executed and VT>0, the suspend condition is satisfied. It is assumed that one read command arrives at input #0 at this time. In this case, at time t+2, the scheduler 21 suspends the execution of the program command by transmitting the suspend command to the NAND flash memory die and, instead, starts the execution of the first read command input to input #0. In accordance with start of the execution of the read command, the weight Wr (=1) corresponding to the read command is subtracted from VT such that VT=+25−1=+24.

It is assumed here that a subsequent read command is not input to input #0. VT>0, but a new read command which can be executed is not present in input #0. For this reason, when the execution of the read command is completed, the scheduler 21 transmits a command to instruct resuming the execution of the suspended program command to the NAND flash memory die, and thereby resumes the execution of the suspended program command, at time t+3. Since the weight of this program command is already added to VT, updating VT is not executed at time t+3.

In general, the time required to execute each of the program operation and the erase operation is longer than the time required to execute the read operation. Therefore, when the suspend condition is satisfied, start of the execution of the read command can be prevented from being delayed by the preceding program command or erase command, by suspending the program command or erase command which is being executed and preferentially executing the read command.

Figure 10:
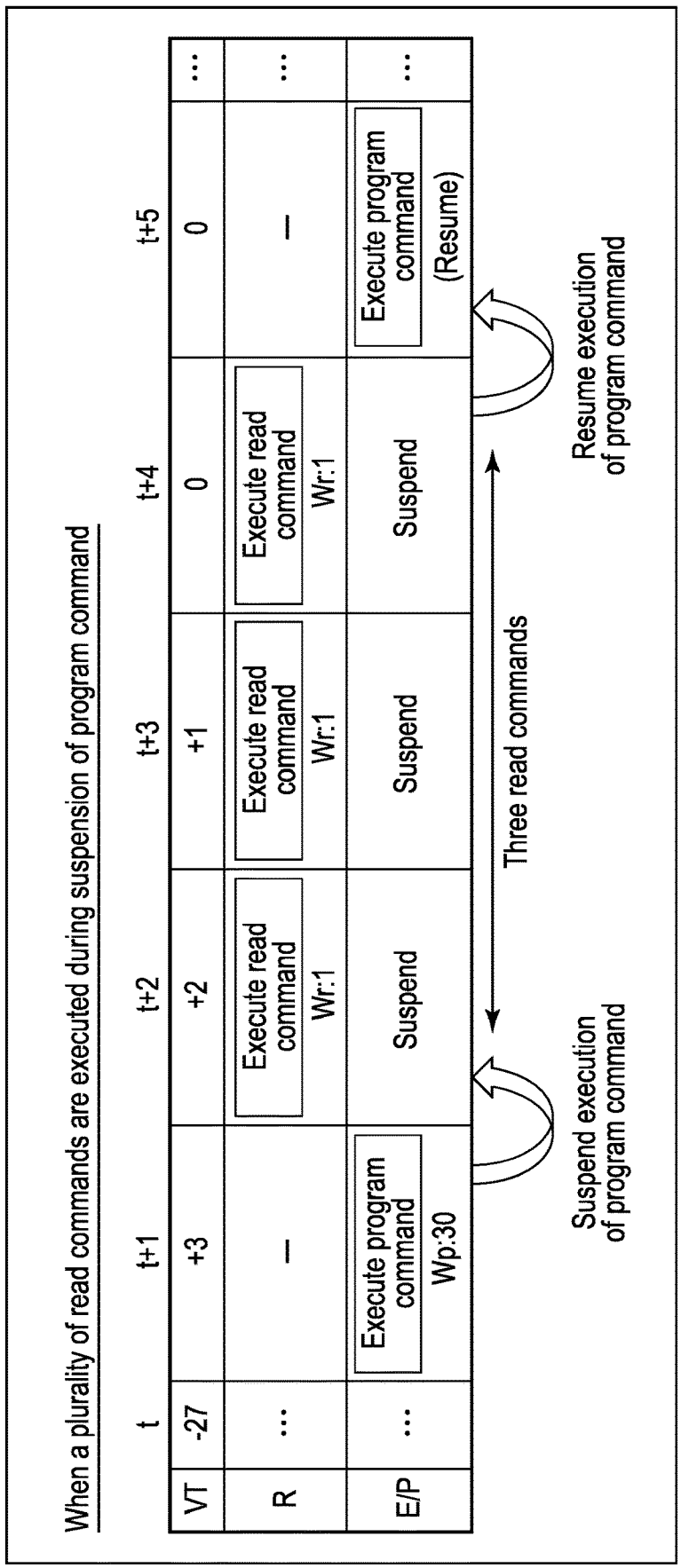
FIG. 10 is a diagram illustrating an operation of suspending the execution of the program command of input #1 and executing a plurality of read commands of input #0 while the execution of the program command is suspended.

FIG. 10 is a diagram illustrating an operation of suspending the execution of the program command of input #1 and executing a plurality of read commands of input #0 while the execution of the program command is suspended.

When VT=−27<0, at certain time t, the scheduler 21 preferentially selects the command (program command or erase command) input to input #1 as a command to be next executed. At time t+1, the execution of the program command is started, and the weight Wp (=30) corresponding to the program command is added to VT such that VT=−27+30=+3.

It is assumed here that, for example, three read commands are sequentially input to input #0 while the program command is executed. In this case, since the program command is being executed and VT>0, the suspend condition is satisfied. Therefore, at time t+2, the scheduler 21 suspends the execution of the program command by transmitting the suspend command to the NAND flash memory die and, instead, starts the execution of the first read command input to input #0. In accordance with start of the execution of the first read command, the weight Wr (=1) corresponding to the read command is subtracted from VT such that VT=+3−1=+2. Since VT>0, the suspend condition is still satisfied.

When the execution of the first read command is completed, the execution of the second read command is started, at time t+3, and the weight Wr (=1) corresponding to the second read command is subtracted from VT such that VT=+2−1=+1. Since VT>0, the suspend condition is still satisfied.

When the execution of the second read command is completed, the execution of the third read command is started, at time t+4, and the weight Wr (=1) corresponding to the third read command is subtracted from VT such that VT=+1−1=0. Since VT=0, the suspend condition is not satisfied.

Therefore, when the execution of the third read command is completed, the scheduler 21 transmits a command to instruct resuming the execution of the suspended program command to the NAND flash memory die, and thereby resumes the execution of the suspended program command, at time t+5. Since the weight of this program command is already added to VT, updating VT is not executed at time t+5.

Executing three read commands while the program command is suspended has been described. However, the number of read commands executed may be one or four or more.

Figure 11:
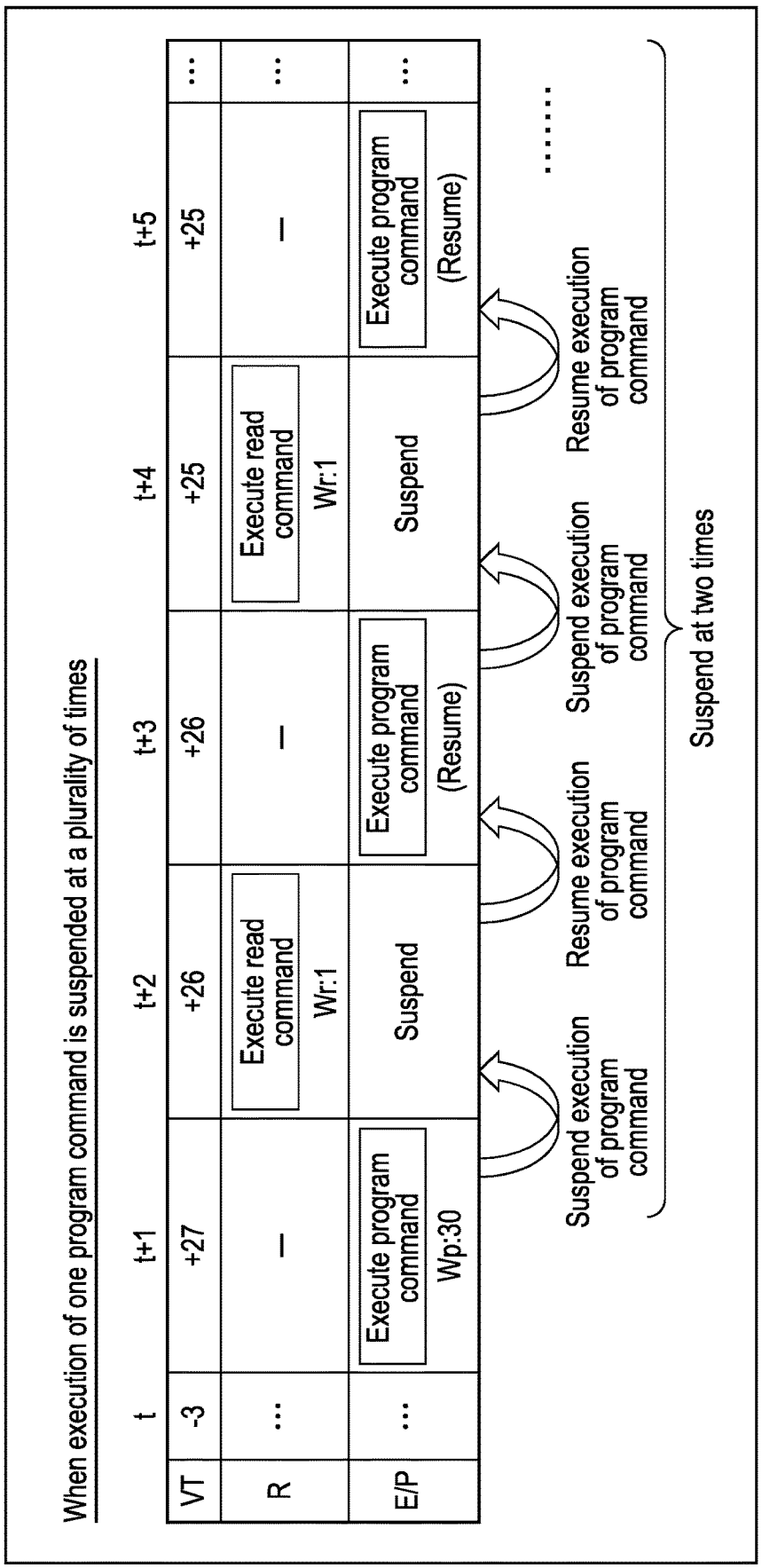
FIG. 11 is a diagram illustrating an operation of suspending the execution of the program command of input #1 at a plurality of times.

FIG. 11 is a diagram illustrating an operation of suspending the execution of the program command of input #1 at a plurality of times.

When VT=−3, at certain time t, the scheduler 21 selects input #1 as the input of high priority since VT<0. At time t+1, the execution of the program command is started, and the weight Wp (=30) corresponding to the program command is added to VT such that VT=−3+30=+27.

Since the program command is being executed and VT>0, the suspend condition is satisfied. It is assumed that one read command is input to input #0 at this time. In this case, at time t+2, the scheduler 21 suspends the execution of the program command by transmitting the suspend command to the NAND flash memory die and, instead, starts the execution of the read command input to input #0. In accordance with start of the execution of the read command, the weight Wr (=1) corresponding to the read command is subtracted from VT such that VT=+27−1=+26.

It is assumed here that a subsequent read command is not input to input #0. VT>0, but the read command which can be executed is not present in input #0. For this reason, when the execution of the read command is completed, the scheduler 21 transmits a command to instruct resuming the execution of the suspended program command to the NAND flash memory die, and thereby resumes the execution of the suspended program command, at time t+3. Since the weight of this program command is already added to VT, updating VT is not executed at time t+3.

Since the program command is being executed and VT>0, the suspend condition is satisfied. It is assumed that one read command is input to input #0 at this time. In this case, at time t+4, the scheduler 21 suspends again the execution of the program command by transmitting the suspend command to the NAND flash memory die and, instead, starts the execution of one subsequent read command input to input #0. In accordance with start of the execution of the subsequent read command, the weight Wr (=1) corresponding to the subsequent command is subtracted from VT such that VT=+26−1=+25.

It is assumed here that another subsequent read command is not input to input #0. VT>0, but the read command which can be executed is not present in input #0. For this reason, when the execution of the subsequent read command is completed, the scheduler 21 transmits a command to instruct resuming the execution of the suspended program command to the NAND flash memory die, and thereby resumes the execution of the suspended program command, at time t+5.

Since the weight of this program command is already added to VT, updating VT is not executed at time t+5.

Suspending the execution of the program command at two times has been described. However, the suspension may be executed at three or more times. In a case where the upper limit of the number of times of the suspension is defined, however, after the number of times of suspension of the program command reaches the upper limit of the number of times of the suspension, the scheduler 21 continues the execution of this program command without suspending the execution of the program command, even if the suspend condition is satisfied.

Figure 12:
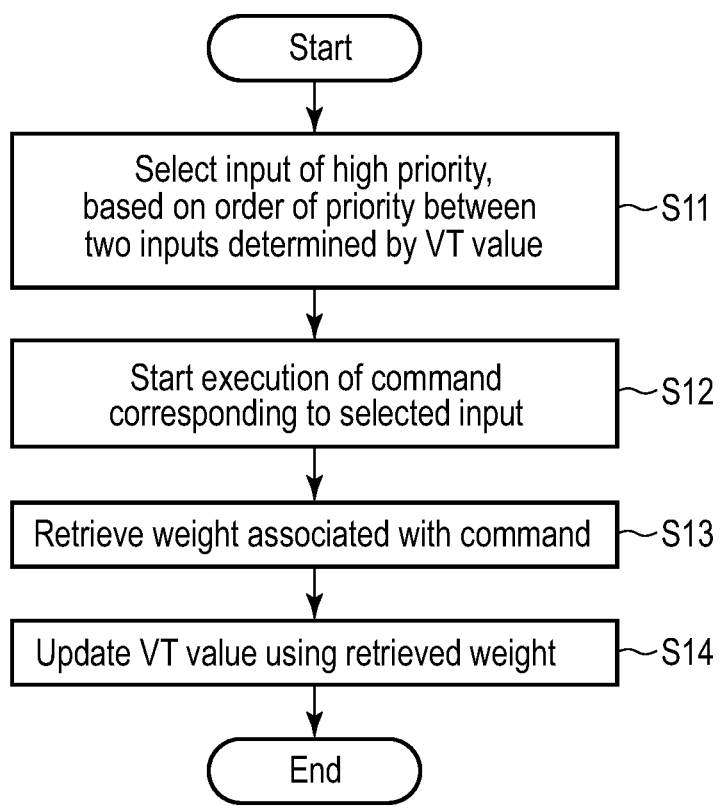
FIG. 12 is a flowchart illustrating a basic procedure of the scheduling operation executed in the memory system according to the embodiment.

FIG. 12 is a flowchart illustrating the basic procedure of the scheduling operation executed in the flash storage device 3. The scheduling operation of determining a command which is to be executed by a specified NAND flash memory die, of the commands to be transmitted to the specified NAND flash memory die will be described below. The scheduling operation for each of the other NAND flash memory dies will be executed in the same procedure.

The scheduler 21 selects the input of high priority whose command is to be executed, from the two inputs (input #0 and input #1) corresponding to a specified NAND flash memory die, based on the order of priority between the two inputs (input #0 and input #1) determined by the VT value corresponding to the specified NAND flash memory die (step S11). In step S11, the scheduler 21 retrieves the VT value from the cumulative weight management table T #0 corresponding to the specified NAND flash memory die, and selects input #0 as the input of high priority when the VT value is larger than the first value (for example, 0) or selects input #1 as the input of high priority when the VT value is smaller than the first value (for example, 0).

The scheduler 21 starts the execution of one command corresponding to the selected input of high priority (step S12). In step S12, the scheduler 21 transmits the command sequence instructing the operation corresponding to one command corresponding to the selected input of high priority to the specified NAND flash memory die.

The scheduler 21 retrieves the weight associated with the command whose execution is started (step S13). When the weight is included in the command itself, the scheduler 21 retrieves the weight associated with the command from the command. Alternatively when the weight Wr associated with the read command, the weight Wp associated with the program command, and the weight We associated with the erase command are managed by the weight management table T #1, the scheduler 21 retrieves the weight corresponding to the type of the command whose execution is started, from the management table T #1.

The scheduler 21 updates the VT value by using the weight retrieved in step S13 (step S14). When the command whose execution is started is the read command, VT is updated to a value obtained by subtracting the weight Wr associated with the read command from the VT value (VT=VT-Wr). When the command whose execution is started is the program command, VT is updated to a value obtained by adding the weight (Wp or We) associated with this command to the VT value (VT=VT+Wp or VT=VT+We).

Figure 13:
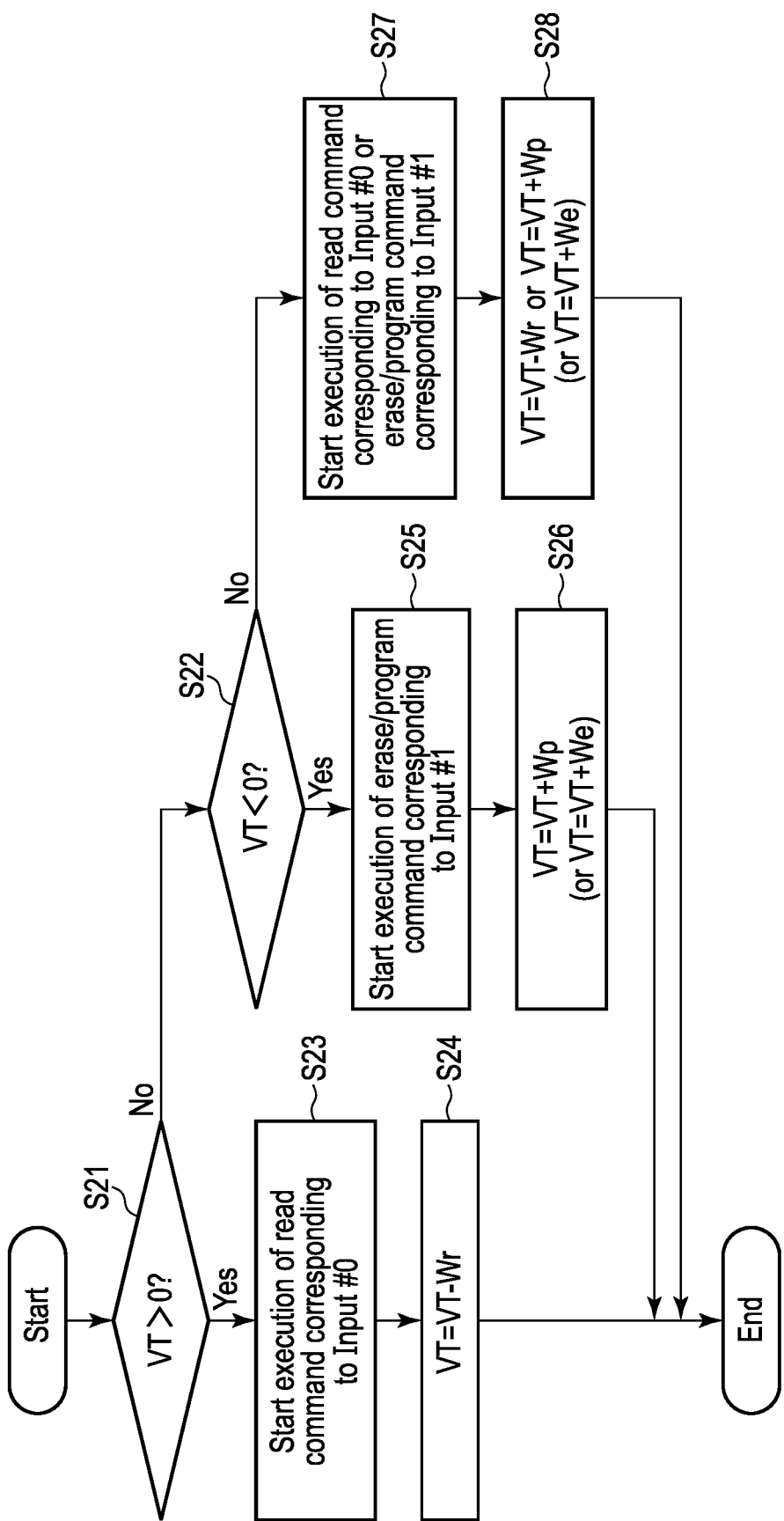
FIG. 13 is a flowchart illustrating a procedure of the input selection operation executed in accordance with VT, in the scheduling operation of FIG. 12.

FIG. 13 is a flowchart illustrating a procedure of the input selection operation executed in accordance with VT, in the scheduling operation of FIG. 12.

The scheduler 21 determines whether the VT value is larger than or smaller than or equal to the threshold value (for example, 0) (steps S21 and S22).

When the VT value is larger than 0 (YES in step S21), the scheduler 21 selects input #0 as the input of high priority and starts the execution of the read command corresponding to selected input #0 (step S23). Then, the scheduler 21 updates the VT value by subtracting the weight Wr corresponding to the read command from the VT value (VT=VT-Wr) (step S24).

When the VT value is smaller than 0 (YES in step S22), the scheduler 21 selects input #1 as the input of high priority and starts the execution of the erase/program command corresponding to selected input #1 (step S25). Then, the scheduler 21 updates the VT value by adding the weight (Wp or We) corresponding to the erase/program command to the VT value (VT=VT+Wp or VT=VT+We) (step S26).

When the VT value is equal to 0 (NO in step S22), the scheduler 21 selects input #0 or input #1 and starts the execution of the read command corresponding to input #0 or the erase/program command corresponding to input #1 (step S27). At this time, the input to be selected as the input of higher priority may be predetermined.

Then, the scheduler 21 updates the VT value by using the weight associated with the command whose execution is started (step S28). When the command whose execution is started in step S27 is the read command, the scheduler 21 updates the VT value by subtracting the weight Wr associated with the execution target read command from the VT value (VT=VT−Wr). When the command whose execution is started is the program command or the erase command in step S27, the scheduler 21 updates VT value by adding the weight Wp or We corresponding to the program command or the erase command to the VT value (VT=VT+Wp or VT=VT+We).

Figure 14:
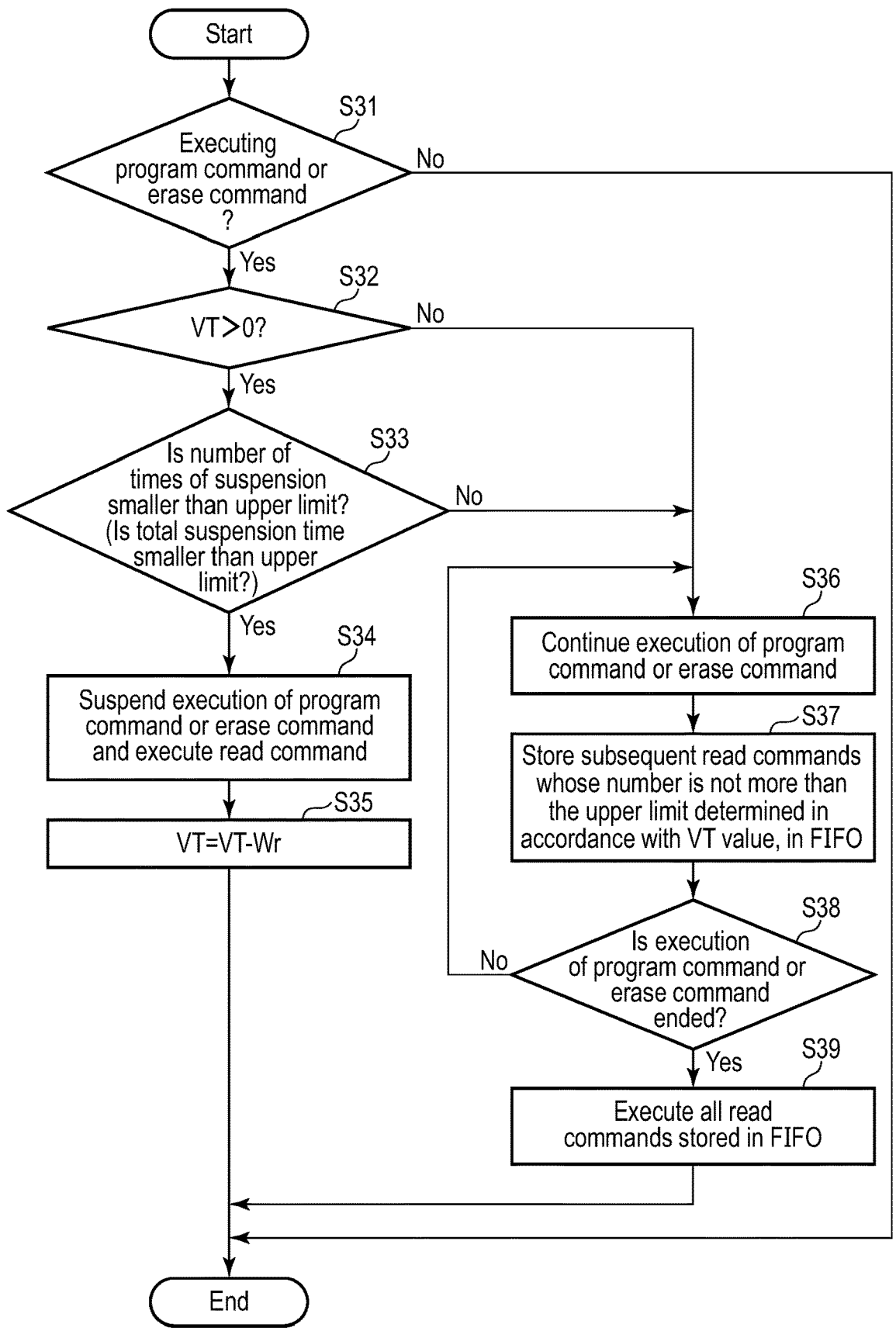
FIG. 14 is a flowchart illustrating a procedure of the suspend operation executed in the scheduling operation of FIG. 12.

FIG. 14 is a flowchart illustrating a procedure of the suspend operation executed in the scheduling operation of FIG. 12.

The scheduler 21 determines whether or not the program command or the erase command is being executed in the NAND flash memory (step S31). When the program command or the erase command is being executed (YES in step S31), the scheduler 21 determines whether or not the VT value is larger than 0 (step S32). That is, the scheduler 21 determines whether or not the suspend condition is satisfied.

When the VT value is larger than 0 (YES in step S32), the scheduler 21 determines whether or not the number of times of suspension (or the total suspension time) for the program command or the erase command which is being executed is smaller than the upper limit (step S33).

When the number of times of suspension (or the total suspension time) for the program command or erase command which is being executed is smaller than the upper limit (YES in step S33), the scheduler 21 suspends the execution of the program command or erase command which is being executed and starts the execution of the read command by transmitting the suspend command to the NAND flash memory die (step S34). Then, the scheduler 21 updates the VT value by subtracting the weight Wr corresponding to the execution target read command from the VT value (VT=VT−Wr) (step S35).

When the VT value is smaller than or equal to 0 (NO in step S32) or the number of times of suspension (or the total suspension time) for the program command or erase command which is being executed reaches the upper limit (NO in step S33), the scheduler 21 continues the execution of the program command or the erase command without suspending the execution of the program command or the erase command (step S36).

The scheduler 21 determines the upper limit of the number of read commands that can be stored in the command queue (FIFO) 30 in accordance with the VT value, and stores subsequent read commands up to the upper limit in the command queue (FIFO) 30 (step S37). For example, when the VT value is larger than 0 and when the weight associated with the read command is 1, the upper limit of read commands that can be stored in the command queue (FIFO) 30 is set to the value equal to the VT value. When the VT value is smaller than or equal to 0, the upper limit of read commands that can be stored in the command queue (FIFO) 30 is set to 1.

The scheduler 21 determines whether or not execution of the program command or the erase command is completed (step S38).

When the execution of the program command or the erase command is not completed (NO in step S38), the execution of the program command or the erase command is continued (step S36).

When the execution of the program command or the erase command is completed (YES in step S38), the scheduler 21 sequentially executes all the read commands stored in the command queue (FIFO) 30 (step S39).

Figure 15:
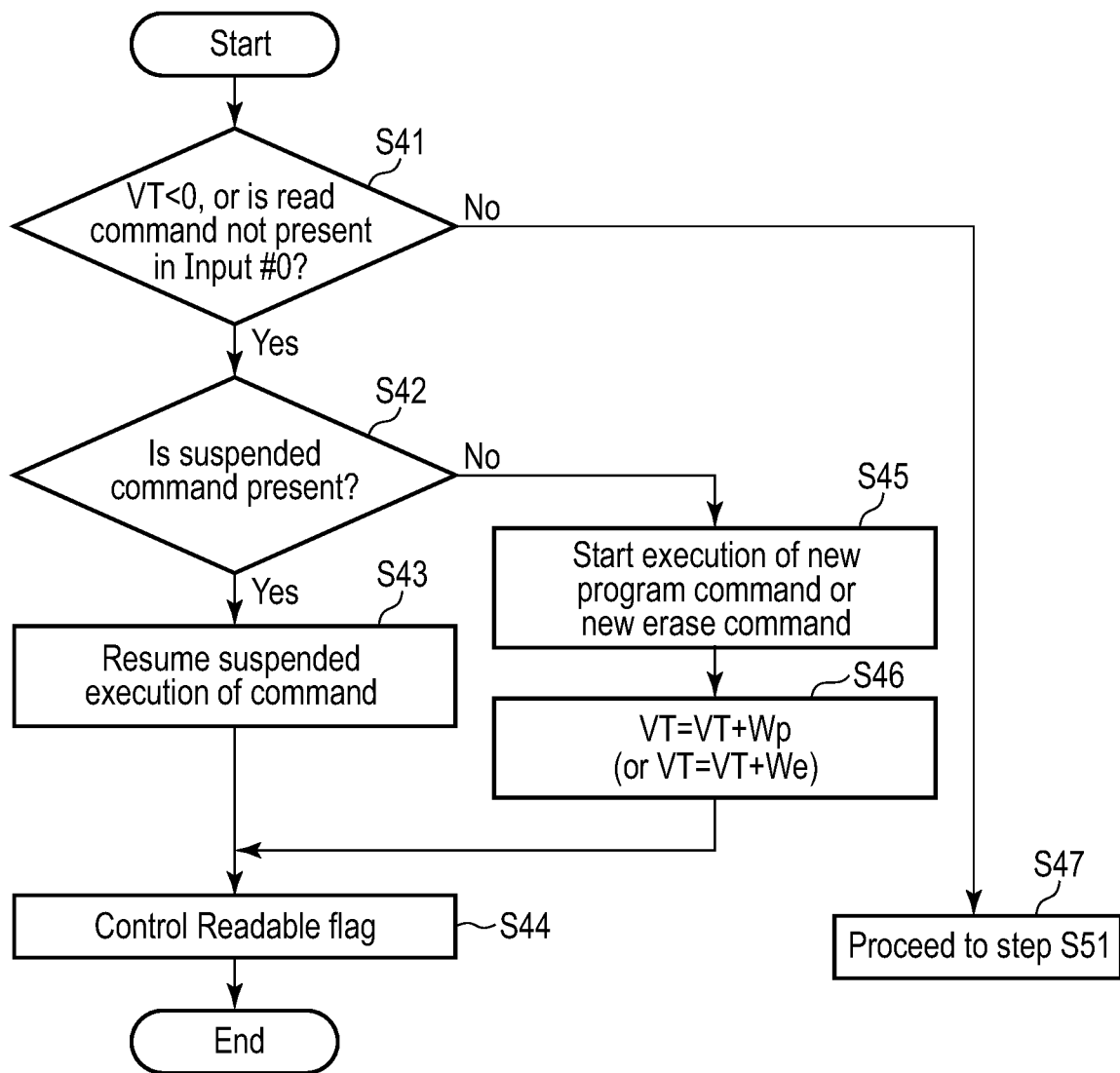
FIG. 15 is a flowchart illustrating a part of a procedure of the scheduling operation including the suspend operation and a resume operation.

FIG. 15 is a flowchart illustrating a part of a procedure of the scheduling operation including the suspend operation and the resume operation.

The scheduler 21 determines whether or not the condition that the VT value is smaller than 0 or the read command is not present in input #0 is satisfied (step S41).

When the VT value is smaller than 0 or the read command is not present in input #0 (YES in step S41), the scheduler 21 determines whether or not the suspended program command or the suspended erase command is present (step S42).

When the suspended program command or the suspended erase command is present (YES in step S42), the scheduler 21 resumes the execution of the suspended program command or the suspended erase command (step S43). At this time, since the suspended command is resumed, updating the VT value is not executed.

After that, the suspend manager 22 controls the readable flag (step S44). In step S44, the readable flag is maintained in the off state during a period from when the execution of the suspended command is resumed until the interval time elapses. When the number of times of suspension or the total suspension time for the resumed program command or erase command does not reach the upper limit value, the readable flag is changed to the on state after the interval time has elapsed (step S44).

When the suspended program command or erase command is absent (NO in step S42), the scheduler 21 starts execution of a new program command or a new erase command input to input #1 (step S45). Then, the scheduler 21 updates the VT value by adding the weight Wp or We corresponding to the new program command or the new erase command to the VT value (VT=VT+Wp or VT=VT+We) (step S46). After that, the suspend manager 22 controls the readable flag (step S44). For example, when the number of times of suspension or the total suspension time for the program command or erase command, whose execution is started, reaches the upper limit value, the suspend manager 22 sets the readable flag to the off state. When the number of times of suspension or the total suspension time does not reach the upper limit value, the suspend manager 22 sets the readable flag to the on state.

Figure 16:
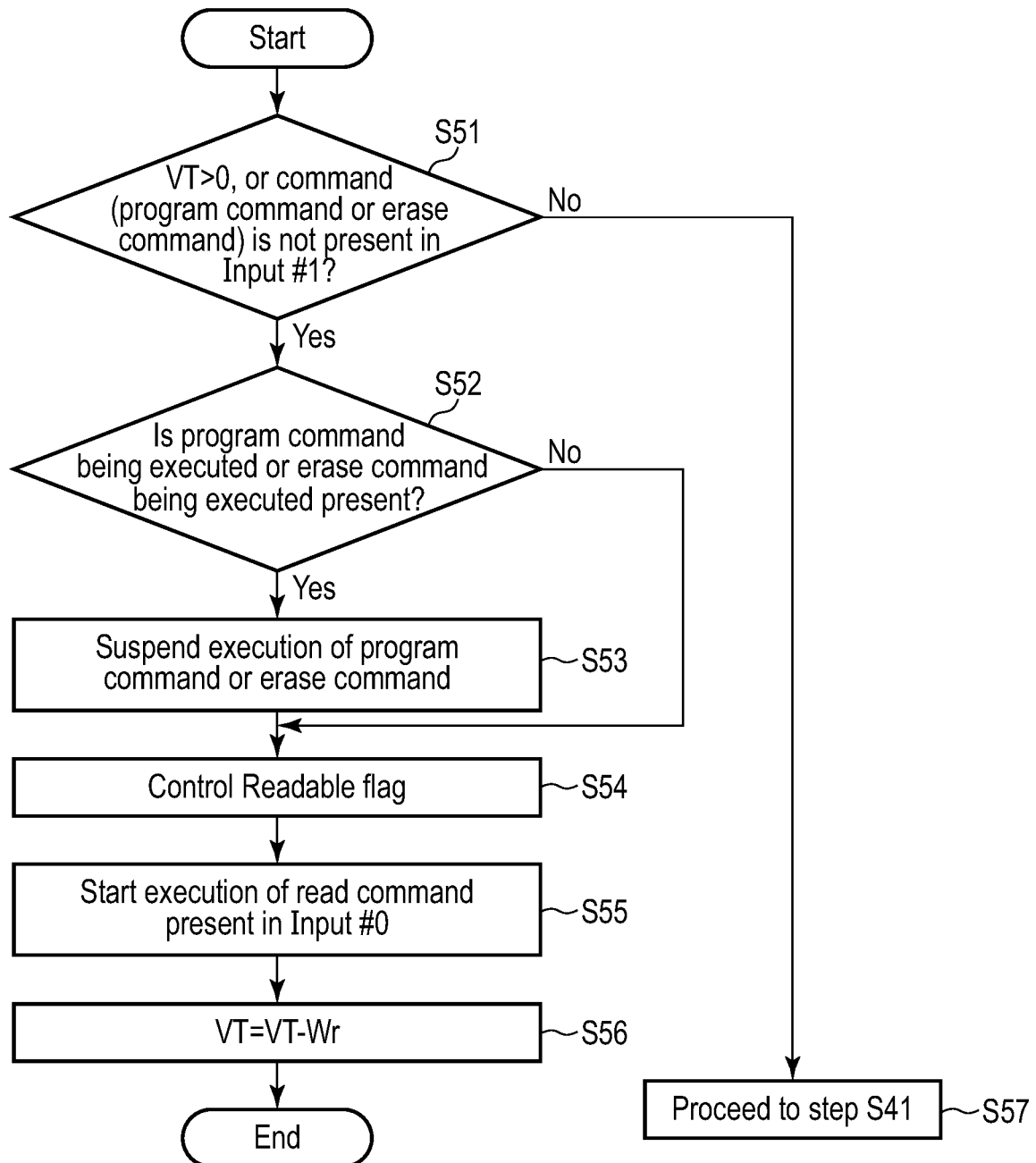
FIG. 16 is a flowchart illustrating a remaining part of the procedure of the scheduling operation including the suspend operation and the resume operation.

When the condition that the VT value is smaller than 0 or the read command is not present in input #0 is not satisfied (NO in step S41), the process proceeds to step S51 of FIG. 16 (step S47).

FIG. 16 is a flowchart illustrating a remaining part of the procedure of the scheduling operation including the suspend operation and the resume operation.

The scheduler 21 determines whether or not the condition that the VT value is larger than 0 or the program command or the erase command is not present in input #1 is satisfied (step S51).

When the VT value is larger than 0 or the program command or the erase command is not present in input #1 (YES in step S51), the scheduler 21 determines whether or not the program command which is being executed or the erase command which is being executed is present (step S52).

When the program command which is being executed or the erase command which is being executed is present (YES in step S52), the scheduler 21 suspends the program command which is being executed or the erase command which is being executed by transmitting the suspend command to the NAND flash memory die, in order to execute the read command (step S53).

After step S53 or when the program command which is being executed or the erase command which is being executed is not present (NO in step S52), the suspend manager 22 changes the readable flag to the off state for preparation for the execution of the read command, and the scheduler 21 starts the execution of the read command corresponding to input #0 (steps S54 and S55). Then, the scheduler 21 updates the VT value by subtracting the weight Wr corresponding to the read command from the VT value (VT=VT−Wr) (step S56).

When the condition that the VT value is larger than 0 or the program command or the erase command is not present in input #1 is not satisfied (NO in step S51), the process proceeds to above-described step S41 of FIG. 15 (step S57).

As described above, in the embodiments, the input of high priority whose command is to be executed is selected, based on the cumulative weight, from input #0 for accepting the read commands to be transmitted to the NAND flash memory 5, and input #1 for accepting the program commands to be transmitted to the NAND flash memory 5 and the erase commands to be transmitted to the NAND flash memory 5. Then, the execution of the command corresponding to the selected input of high priority is started and the cumulative weight (VT) is updated by using the weight associated with this command.

For example, in the case of using the policy #1, when the execution of one read command of input #0 is started, the cumulative weight is updated to a value obtained by subtracting the weight associated with the read command from this cumulative weight. In addition, when execution of one erase/program command of input #1 is started, the cumulative weight is updated to a value obtained by adding the weight associated with the erase/program command to the cumulative weight. Therefore, when the weight associated with each read command is set to, for example, 1 and the weight associated with each erase/program command is set to, for example, 30, a set of read commands can be executed at a frequency thirty times as large as a set of erase/program commands. Therefore, the scheduling operation can be executed such that the ratio of the number of the executed read commands to the number of the executed erase/program commands becomes the ratio corresponding to the time distribution required by the host 2.

In addition, when the command executed in the NAND flash memory 5 is the erase/program command and when the condition that the current cumulative weight value is larger than the first value (i.e., suspend condition) is satisfied (in a case where the policy #2 is used, when the condition that the current cumulative weight value is smaller than the first value is satisfied), the execution of the erase/program command is suspended. After suspending the execution of the erase/program command, the operation of starting the execution of the read command and the operation of updating the cumulative weight by using the weight associated with this read command are repeatedly executed until the read command no longer exists in input #0 or until the condition that the cumulative weight is larger than the first value is not satisfied (in the case where the policy #2 is used, until the condition that the cumulative weight value is smaller than the first value is not satisfied), and then the execution of the erase/program command which is being suspended is resumed.

Therefore, the variation amount of the read latency can be reduced while the ratio of the number of the executed read commands to the number of the executed erase/program commands is controlled to be close to the ratio corresponding to the time distribution, which is required by the host 2.

When a plurality of read commands arrive at input #0 and the cumulative weight is larger than or equal to the sum of weights of the respective read commands, the plurality of read commands can be executed during one-time suspension. For this reason, the variation of the read latency can be efficiently reduced under the condition of the limited number of times of suspension.

Furthermore, in the embodiments, when the cumulative weight value satisfies the condition that input #0 is selected as the input of high priority, the upper limit of the number of read commands that can be stored in the command queue 30 is set to the number proportional to the cumulative weight value. As a result, control of making the ratio between the number of the executed read commands and the number of the executed erase/program commands close to the ratio corresponding to the time distribution, which is required by the host 2 can be efficiently executed without increasing the size of the command queue 30 more than required. In addition, when the cumulative weight value does not satisfy the condition that input #0 is selected as the input of high priority, the upper limit of the number of read commands that can be stored in the command queue 30 is set to 1. Thus, the maximum number of read commands that can be stored in the command queue can be maintained at 1 while the cumulative weight does not satisfy the condition that the first input is selected as the input of high priority. Therefore, for example, the read commands in the command queue 30 can be quickly executed immediately after the erase/program commands disappear in the input #1.

As described above, access to the NAND flash memory 5 can be flexibly controlled in the embodiments.

In the embodiments, when the command executed in the NAND flash memory 5 is the erase/program command and when the cumulative weight value is larger than the first value, the execution of the erase/program command is suspended. However, when the command executed in the NAND flash memory 5 is the erase/program command and when the cumulative weight value is larger than or equal to the first value, the execution of the erase/program command may be suspended.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
   a nonvolatile memory; and
   a controller electrically connected to the nonvolatile memory and configured to:
   select an input of high priority with a command for execution, based on a cumulative weight, from a first input for accepting read commands to be transmitted to the nonvolatile memory and a second input for accepting erase commands to be transmitted to the nonvolatile memory and program commands to be transmitted to the nonvolatile memory;
   start execution of a command corresponding to the selected input of high priority, and update the cumulative weight by using a weight associated with the command for which execution is started;
   when execution of a command of one of the first input and the second input is started, update the cumulative weight to a value obtained by subtracting a weight associated with the command of the one of the first input and the second input from the cumulative weight;
   when execution of a command of the other of the first input and the second input is started, update the cumulative weight to a value obtained by adding a weight associated with the command of the other of the first input and the second input to the cumulative weight;
   while a first condition that a current value of the cumulative weight is larger than a first value is satisfied, select the one of the first input and the second input as the input of high priority;
   while a second condition that the current value of the cumulative weight is smaller than the first value is satisfied, select the other of the first input and the second input as the input of high priority;
   when a command which is being executed in the nonvolatile memory is an erase command or a program command and when the current value of the cumulative weight satisfies a condition that the first input is selected as the input of high priority, of the first condition and the second condition, suspend execution of the erase command or the program command by transmitting a suspend command to the nonvolatile memory; and
   repeatedly execute an operation of starting execution of one read command of the first input and an operation of updating the cumulative weight by using a weight associated with the one read command until a read command no longer exists in the first input or until the cumulative weight does not satisfy the condition that the first input is selected as the input of high priority, and then resume execution of the suspended erase command or the suspended program command.

2. The memory system of claim 1, wherein
   an upper limit value is set in the nonvolatile memory to a number of times of suspension allowed during the execution of the erase command or the program command or a total suspension time allowed during the execution of the erase command or the program command, the controller is further configured to continue the execution of the erase command or the program command without suspending the execution of the erase command or the program command, irrespective of the current value of the cumulative weight, after the number of times of suspension allowed or the total suspension time allowed of the erase command or the program command which is being executed reaches the upper limit value.

3. The memory system of claim 2, wherein
an interval time to be secured between the resumption of the execution of the erase command or the program command and a next suspension is further defined in the nonvolatile memory,
the controller is further configured to continue the execution of the erase command or the program command without suspending the execution of the erase command or the program command, irrespective of the current value of the cumulative weight, while an elapsed time from the resumption of the execution of the erase command or the program command is less than the interval time.

4. The memory system of claim 2, wherein
the controller includes a command queue capable of storing one or more read commands to be transmitted to the nonvolatile memory, and the controller is further configured to:
when the current value of the cumulative weight satisfies the condition that the first input is selected as the input of high priority, set an upper limit of a number of read commands capable of being stored in the command queue to a number proportional to the current value of the cumulative weight; and
when the current value of the cumulative weight does not satisfy the condition that the first input is selected as the input of high priority, set the upper limit of the number of read commands capable of being stored in the command queue to 1.

5. The memory system of claim 4, wherein
the controller is further configured to, when a plurality of read commands are stored in the command queue, transmit the plurality of read commands stored in the command queue to the nonvolatile memory in an order of storing the plurality of read commands in the command queue or an order of respective weights associated with each of the plurality of read commands, respectively.

6. The memory system of claim 1, wherein
the controller includes a command queue capable of storing one or more read commands to be transmitted to the nonvolatile memory, and the controller is further configured to:
when the current value of the cumulative weight satisfies the condition that the first input is selected as the input of high priority, set an upper limit of a number of read commands capable of being stored in the command queue to a number proportional to the current value of the cumulative weight; and
when the current value of the cumulative weight does not satisfy the condition that the first input is selected as the input of high priority, set the upper limit of the number of read commands capable of being stored in the command queue to 1.

7. The memory system of claim 6, wherein
the controller is further configured to, when a plurality of read commands are stored in the command queue, transmit the plurality of read commands stored in the command queue to the nonvolatile memory in an order of storing the plurality of read commands in the command queue or an order of respective weights associated with each of the plurality of read commands, respectively.

8. The memory system of claim 1, wherein
the nonvolatile memory is configured to execute the read command, the erase command, and the program command, and
a time required to execute the read command is shorter than a time required to execute the erase command or the program command.

9. A memory system comprising:
a nonvolatile memory configured to execute a read command, an erase command, and a program command, and comprising a function of suspending the execution of an erase command or a program command and executing one or more read commands during the suspension of the execution of the erase command or the program command, wherein a time required to execute the read command is shorter than a time required to execute the erase command or the program command; and
a controller electrically connected to the nonvolatile memory and configured to: select a command group of high priority to be executed, based on a cumulative weight, from a first command group including read commands to be transmitted to the nonvolatile memory and a second command group including erase commands to be transmitted to the nonvolatile memory and program commands to be transmitted to the nonvolatile memory, start execution of a command corresponding to the selected command group of high priority, and update the cumulative weight by using a weight associated with the command for which execution is started;
when execution of a command in one of the first command group and the second command group is started, update the cumulative weight to a value obtained by subtracting a weight associated with the command of the one of the first command group and the second command group from the cumulative weight;
when execution of a command in the other of the first command group and the second command group is started, update the cumulative weight to a value obtained by adding a weight associated with the command of the other of the first command group and the second command group to the cumulative weight;
while a first condition that a value of the cumulative weight is larger than a first value is satisfied, select the one of the first command group and the second command group as the command group of high priority;
while a second condition that the current value of the cumulative weight is smaller than the first value is satisfied, select the other of the first command group and the second command group as the input of high priority;
when a command which is being executed in the nonvolatile memory is an erase command in the second command croup or the program command in the second command group and when the current value of the cumulative weight satisfies a condition that the first command group is selected as the command group of high priority, of the first condition and the second condition, suspend execution of the erase command or the program command by transmitting a suspend command to the nonvolatile memory; and repeatedly execute an operation of starting execution of one read command in the first command group and an operation of updating the cumulative weight by using a weight associated with the one read command until a read command no longer exists in the first command group or until the cumulative weight does not satisfy the condition that the first command group is selected as the command group of high priority, and then resume execution of the suspended erase command or the suspended program command.

10. A method executed in a controller configured to control a nonvolatile memory, the method comprising:

selecting an input of high priority whose command is to be executed, based on a cumulative weight, from a first input for accepting read commands to be transmitted to the nonvolatile memory and a second input for accepting erase commands to be transmitted to the nonvolatile memory and program commands to be transmitted to the nonvolatile memory;

starting execution of a command corresponding to the selected input of high priority;

updating the cumulative weight by using a weight associated with the command for which execution is started;

determining execution of a command of one of the first input and the second input is started, and in response, updating the cumulative weight to a value obtained by subtracting a weight associated with the command of the one of the first input and second input from the cumulative weight;

determining execution of a command of the other of the first input and the second input is started, and in response, updating the cumulative weight to a value obtained by adding a weight associated with the command of the other of the first input and second input to the cumulative weight;

determining a first condition that a current value of the cumulative weight is larger than a first value is satisfied, and in response, selecting the one of the first input and second input as the input of high priority, determining a second condition that current value of the cumulative weight is smaller than the first value is satisfied, and in response, selecting the other of the first input and second input as the input of high priority;

determining a command which is being executed in the nonvolatile memory is an erase command or a program command and the current value of the cumulative weight satisfies a condition that the first input is selected as the input of high priority, of the first condition and the second condition, and in response, suspending execution of the erase command or the program command by transmitting a suspend command to the nonvolatile memory; and repeatedly executing an operation of starting execution of one read command of the first input and an operation of updating the cumulative weight by using a weight associated with the one read command until determining a read command no longer exists in the first input or until determining the cumulative weight does not satisfy the condition that the first input is selected as the input of high priority;

determining a read command no longer exists in the first input or determining the cumulative weight does not satisfy the condition that the first input is selected as the input of high priority, and in response, resuming execution of the suspended erase command or the suspended program command.

11. The method of claim 10, wherein an upper limit value is set in the nonvolatile memory to a number of times of suspension allowed during the execution of the erase command or the program command or a total suspension time allowed during the execution of the erase command or the program command, and the method further comprising:

continuing the execution of the erase command or the program command without suspending the execution of the erase command or the program command, irrespective of the current value of the cumulative weight, after determining the number of times of suspension allowed or the total suspension time allowed of the erase command or the program command which is being executed reaches the upper limit value.

12. The method of claim 11, wherein, an interval time to be secured between the resumption of the execution of the erase command or the program command and a next suspension is further defined in the nonvolatile memory, and the method further comprising:

continuing the execution of the erase command or the program command without suspending the execution of the erase command or the program command, irrespective of the current value of the cumulative weight, after determining an elapsed time from the resumption of the execution of the erase command or the program command is less than the interval time.

13. The method of claim 11, wherein, the controller includes a command queue capable of storing one or more read commands to be transmitted to the nonvolatile memory, and the method further comprises:

determining the current value of the cumulative weight satisfies the condition that the first input is selected as the input of high priority, and in response, setting an upper limit of the number of read commands capable of being stored in the command queue to a number proportional to the current value of the cumulative weight; and determining the current value of the cumulative weight does not satisfy the condition that the first input is selected as the input of high priority, and in response, setting the upper limit of the number of read commands capable of being stored in the command queue to 1.

14. The method of claim 13, further comprising:

determining a plurality of read commands are stored in the command queue, and in response, transmitting the plurality of read commands stored in the command queue to the nonvolatile memory in an order of storing the plurality of read commands in the command queue or an order of respective weights associated with each of the plurality of read commands, respectively.

15. The method of claim 10, wherein, the controller includes a command queue capable of storing one or more read commands to be transmitted to the nonvolatile memory, and the method further comprising:

determining the current value of the cumulative weight satisfies the condition that the first input is selected as the input of high priority, and in response, setting an upper limit of the number of read commands capable of being stored in the command queue to a number proportional to the current value of the cumulative weight; and determining the current value of the cumulative weight does not satisfy the condition that the first input is selected as the input of high priority, and in response, setting the upper limit of the number of read commands capable of being stored in the command queue to 1.

16. The method of claim 15, further comprising:

determining a plurality of read commands are stored in the command queue, and in response, transmitting the plurality of read commands stored in the command queue to the nonvolatile memory in an order of storing the plurality of read commands in the command queue or an order of respective weights associated with each of the plurality of read commands, respectively.

17. The method of claim 10, wherein the nonvolatile memory is configured to execute the read command, the erase command, and the program command, and a time required to execute the read command is shorter than a time required to execute the erase command or the program command.

* * * * *